United States Patent
Soji et al.

(10) Patent No.: US 12,349,211 B2
(45) Date of Patent: Jul. 1, 2025

(54) SYSTEMS AND METHODS OF DEVICE COMMUNICATION USING STORED PAIR INFORMATION

(71) Applicant: NINTENDO CO., LTD., Kyoto (JP)

(72) Inventors: Hiroki Soji, Kyoto (JP); Hiroyuki Takeuchi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 397 days.

(21) Appl. No.: 17/857,372

(22) Filed: Jul. 5, 2022

(65) Prior Publication Data

US 2023/0011478 A1    Jan. 12, 2023

(30) Foreign Application Priority Data

Jul. 6, 2021    (JP) .................................. 2021-112255

(51) Int. Cl.
*H04W 76/10* (2018.01)
*H04W 8/00* (2009.01)
*H04W 76/11* (2018.01)
*H04W 76/14* (2018.01)

(52) U.S. Cl.
CPC ........... *H04W 76/10* (2018.02); *H04W 8/005* (2013.01); *H04W 76/11* (2018.02); *H04W 76/14* (2018.02)

(58) Field of Classification Search
CPC ..... H04W 76/10; H04W 76/14; H04W 76/11; H04W 8/005
See application file for complete search history.

(56) References Cited

U.S. PATENT DOCUMENTS

| | | | |
|---|---|---|---|
| 10,848,609 B2* | 11/2020 | Konji | H04M 1/72412 |
| 11,006,465 B2* | 5/2021 | Ishikawa | H04W 72/0453 |
| 2016/0156629 A1 | 6/2016 | Yasaki et al. | |
| 2017/0034856 A1 | 2/2017 | Takeuchi et al. | |
| 2018/0176748 A1 | 6/2018 | Kim et al. | |
| 2021/0127247 A1* | 4/2021 | Shimada | H04L 65/1069 |
| 2022/0417828 A1* | 12/2022 | Iwayama | H04W 40/246 |

FOREIGN PATENT DOCUMENTS

| | | |
|---|---|---|
| EP | 3 389 245 | 10/2018 |
| JP | 2014-120041 A | 6/2014 |
| JP | 2016-110204 A | 6/2016 |
| JP | 2016-197447 A | 11/2016 |
| JP | 2017-034655 | 2/2017 |
| JP | 2018-101971 A | 6/2018 |

* cited by examiner

*Primary Examiner* — Chandrahas B Patel
(74) *Attorney, Agent, or Firm* — Nixon & Vanderhye P.C.

(57) ABSTRACT

A communication system includes a first terminal and a second terminal. The second terminal includes a storage in which first information brought in correspondence for each application executed in the first terminal is stored as pair information and a transmitter that transmits, in response to a request from an application executed in the first terminal, second information based on the first information stored in the storage and brought in correspondence with the application executed in the first terminal. The first terminal includes a determination unit that determines processing involved with data communication with the second terminal based on a result of comparison between third information brought in correspondence with a running application on the first terminal and the second information received from the second terminal.

16 Claims, 19 Drawing Sheets

SYSTEMS AND METHODS OF DEVICE COMMUNICATION USING STORED PAIR INFORMATION

This nonprovisional application is based on Japanese Patent Application No. 2021-112255 filed with the Japan Patent Office on Jul. 6, 2021, the entire contents of which are hereby incorporated by reference.

FIELD

The present disclosure relates to a communication system, a communication apparatus, a communication method, and a non-transitory computer-readable storage medium with an executable communication program stored thereon.

BACKGROUND AND SUMMARY

A configuration in which, in execution of an application by an information processing apparatus, the information processing apparatus exchanges data with another apparatus through wireless communication has widely been put into practical use. For example, a communication system including two portable terminals and two BLE terminals has been disclosed. In this communication system, the portable terminals and the BLE terminals are connected, with the portable terminals being defined as centrals and with the BLE terminals being defined as peripherals.

A peripheral terminal may be used by an application executed in a central terminal. A certain peripheral terminal may be used by a plurality of types of applications. On the other hand, a plurality of applications that use the peripheral terminal are not necessarily executed in the same central terminal.

The present disclosure provides a scheme that allows suitable use of a peripheral terminal in each application in an environment in which a peripheral terminal can be used by a plurality of applications and the plurality of applications can be executed in different central terminals.

An exemplary embodiment provides a communication system that includes a first terminal that executes one or more applications and a second terminal that communicates data with the first terminal through wireless communication. The second terminal includes a storage in which first information brought in correspondence for each application executed in the first terminal is stored as pair information and a transmitter that transmits, in response to a request from an application executed in the first terminal, second information based on the first information stored in the storage and brought in correspondence with the application executed in the first terminal. The first terminal determines processing involved with data communication with the second terminal based on a result of comparison between third information brought in correspondence with a running application on the first terminal and the second information received from the second terminal.

According to this configuration, even when various applications are executed in one or more first terminals, appropriate data communication with the second terminal brought in correspondence with each application can be established. Since identification information brought in correspondence with the application executed in the first terminal is stored in the second terminal as pair information, processing necessary for starting data communication between the application executed in the first terminal and the second terminal can be simplified.

The first terminal may include an apparatus that accepts an operation by a user and a management server. According to this configuration, a resource (a storage capacity and a processor resource) necessary for the first terminal can appropriately be designed.

The first terminal may generate the first information to be used as the pair information. According to this configuration, when the first terminal and the second terminal are connected to each other, the first information necessary for the pair information can be provided from the first terminal to the second terminal.

The management server may generate the first information. According to this configuration, generation of the first information necessary for the pair information can centrally be processed in the management server.

The management server may compare the third information and the second information with each other. According to this configuration, comparison between the third information and the second information can centrally be made in the management server.

The first terminal may further include a second storage in which, when the first terminal is connected to the second terminal, an address of the connected second terminal is stored. According to this configuration, processing necessary at the time of re-connection between the first terminal and the second terminal, between which connection was established in the past, can be reduced.

The first terminal may receive an advertisement transmitted from the second terminal and search for the second terminal to be connected. According to this configuration, the first terminal can search for a second terminal present around the first terminal and can more readily start data communication with the corresponding second terminal.

When an address of the second terminal which is a sender of the received advertisement is included in addresses stored in a second storage, the first terminal may start processing for connection to the second terminal which is the sender, and after connection is established, the first terminal may transmit the request to the second terminal. According to this configuration, the first terminal and the second terminal are automatically connected to each other and processing involved with data communication with the second terminal can successively be performed.

The second terminal may be configured to transmit a plurality of types of advertisements. Each of the applications executed in the first terminal may be configured to refer to one or more advertisements specific to the application among the plurality of types of advertisements. According to this configuration, processing involved with data communication can be performed with the use of an appropriate advertisement for each application executed in the first terminal.

The plurality of types of advertisements may include a constantly transmitted advertisement. At this time, any application configured to refer to the constantly transmitted advertisement among the applications executed in the first terminal may be configured to stop transmission of the constantly transmitted advertisement. According to this configuration, the user can stop a constantly transmitted advertisement from any application configured to refer to the constantly transmitted advertisement.

Another exemplary embodiment provides a communication apparatus that includes a memory storing a computer-readable program and one or more processors. The one or more processors, when executing the computer-readable program, perform executing one or more applications and communicating data with a peripheral terminal through wireless communication. In the peripheral terminal, identification information brought in correspondence with each of the applications is stored as first information. The one or more processors perform determining processing involved with data communication with the peripheral terminal based on a result of comparison between second information obtained from the peripheral terminal and third information brought in correspondence with a running application.

Another exemplary embodiment provides a communication apparatus that includes a memory storing a computer-readable program and one or more processors. The one or more processors, when executing the computer-readable program, perform communicating data through wireless communication with a central terminal that executes one or more applications and storing in a storage, identification information brought in correspondence with an application executed in the central terminal as first information. The one or more processors perform transmitting, in response to a request from an application executed in the central terminal, second information based on the first information stored in the storage and brought in correspondence with the application executed in the central terminal.

Another exemplary embodiment provides a communication method performed by a first terminal and a second terminal that communicate data with each other through wireless communication. The communication method includes executing, by the first terminal, one or more applications, storing in the second terminal, first information brought in correspondence with an application executed in the first terminal as pair information, in response to a request from an application executed in the first terminal, transmitting, by the second terminal, second information based on the first information brought in correspondence with the application executed in the first terminal by referring to the pair information, and determining, by the first terminal, processing involved with data communication with the second terminal based on a result of comparison between the second information received from the second terminal and third information brought in correspondence with a running application on the first terminal.

Another exemplary embodiment provides a non-transitory computer-readable storage medium with an executable communication program stored thereon. The communication program, when executed by one or more processors of a communication apparatus that executes one or more applications, causes the one or more processors to perform communicating data with a peripheral terminal through wireless communication. In the peripheral terminal, first information brought in correspondence with an application executed in the communication apparatus is stored as pair information. The communication program further causes the one or more processors to perform determining processing involved with data communication with the peripheral terminal based on a result of comparison between second information obtained from the peripheral terminal and third information brought in correspondence with a running application.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
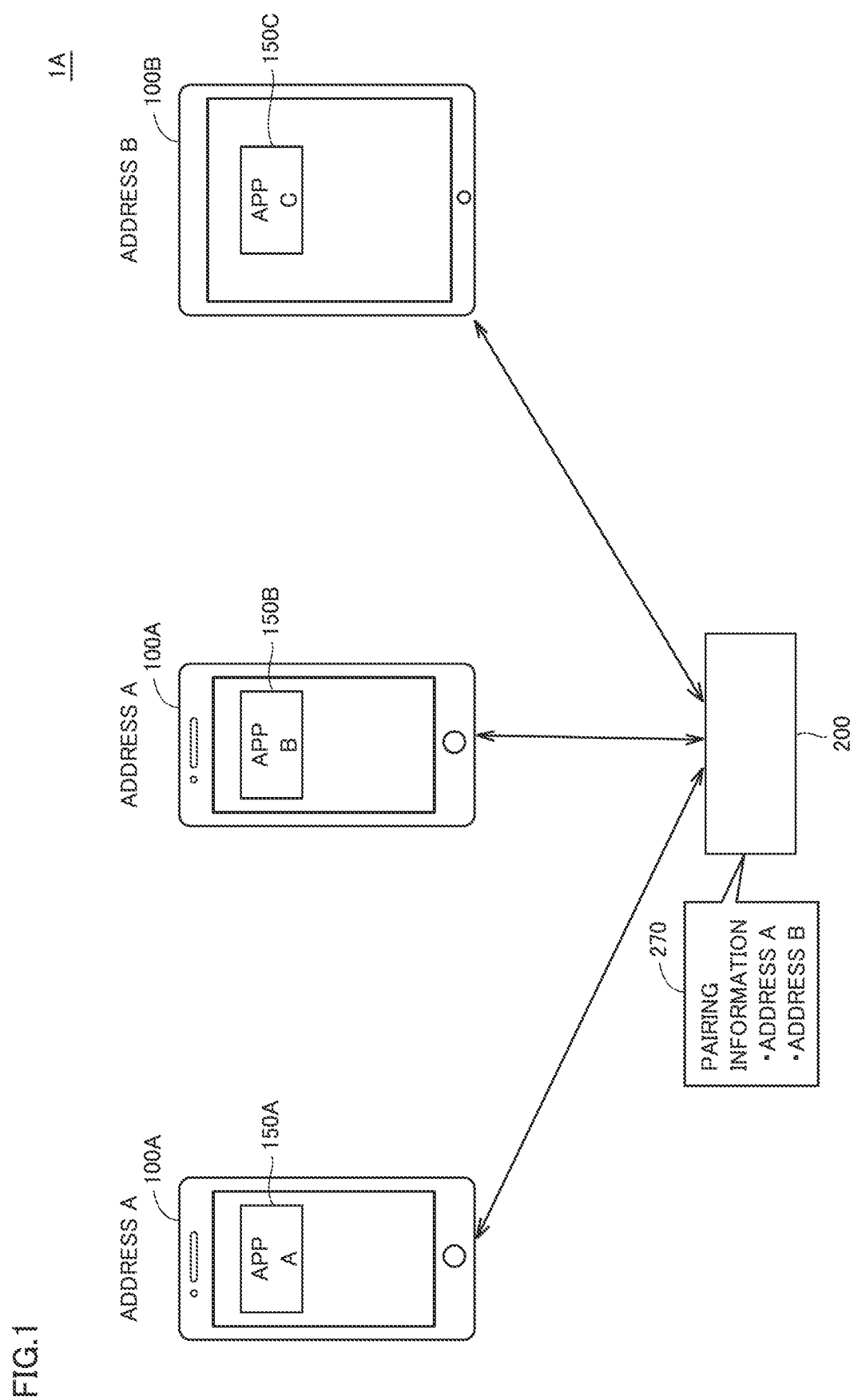
FIG. 1 shows an exemplary illustrative non-limiting drawing illustrating overview of a general communication system relating to the present embodiment.

The present embodiment will be described in detail with reference to the drawings. The same or corresponding elements in the drawings have the same reference characters allotted and description thereof will not be repeated.

[A. Overview]

Overview of a general communication system relating to the present embodiment will initially be described.

Referring to FIG. 1, a communication system 1A includes, for example, a central terminal 100 representing an exemplary communication apparatus and a peripheral terminal 200 that can exchange data with central terminal 100 through wireless communication.

Central terminal 100 is implemented by any information processing apparatus such as a smartphone, a tablet, a personal computer, and a game device. Central terminal 100 executes one or more applications. Peripheral terminal 200 is implemented by any communication apparatus such as a controller, a speaker, a headphone, a camera, and a portable apparatus.

Peripheral terminal 200 communicates data with central terminal 100 through wireless communication. Typically, Bluetooth® can be employed for wireless communication between central terminal 100 and peripheral terminal 200. Though an exemplary configuration using Bluetooth® is mainly described in the description below, any wireless communication such as ZigBee®, wireless LAN (IEEE 802.11), or infrared communication may be employed.

In an example shown in FIG. 1, communication system 1A includes two central terminals 100A and 100B and peripheral terminal 200. Central terminal 100A can execute an application 150A and an application 150B, and central terminal 100B can execute an application 150C. In other words, applications 150A and 150B have been installed in central terminal 100A, and application 150C has been installed in central terminal 100B.

For the sake of convenience of description, FIG. 1 shows a state in which central terminal 100A is executing application 150A and a state in which central terminal 100A is executing application 150B as being juxtaposed. The application may be abbreviated as "app".

Any program that communicates data with peripheral terminal 200 may be applicable as an application 150 executed in central terminal 100.

In communication system 1A shown in FIG. 1, peripheral terminal 200 is used in execution of applications 150A, 150B, and 150C. Applications 150A, 150B, and 150C, however, are not necessarily executed in the same central terminal 100.

Peripheral terminal 200 in which general Bluetooth® is implemented holds pairing information about pairing with central terminal 100 to which peripheral terminal 200 once established connection, and responds to a connection request from central terminal 100 by referring to the pairing information.

In the example shown in FIG. 1, pairing information 270 of peripheral terminal 200 may include an address A of central terminal 100A and an address B of central terminal 100B.

As shown in FIG. 1, however, when application 150A or application 150B is executed in central terminal 100A, central terminal 100A and peripheral terminal 200 should be connected to each other. When application 150C is executed in central terminal 100B, on the other hand, central terminal 100B and peripheral terminal 200 should be connected to each other.

Thus, when peripheral terminal 200 is used by applications 150A, 150B, and 150C, applications 150A, 150B, and 150C are not necessarily executed in the same central terminal 100. In other words, when there are a plurality of applications that use peripheral terminal 200, a scene of use in which the plurality of applications are installed in different central terminals 100 is assumed.

Then, in a communication system 1 according to the present embodiment, pair information 260 that defines connection relation between central terminal 100 and peripheral terminal 200 for each application is used. Pair information 260 held in peripheral terminal 200 includes identification information for each application. By using such pair information 260, each application 150 can suitably use peripheral terminal 200.

Figure 2:
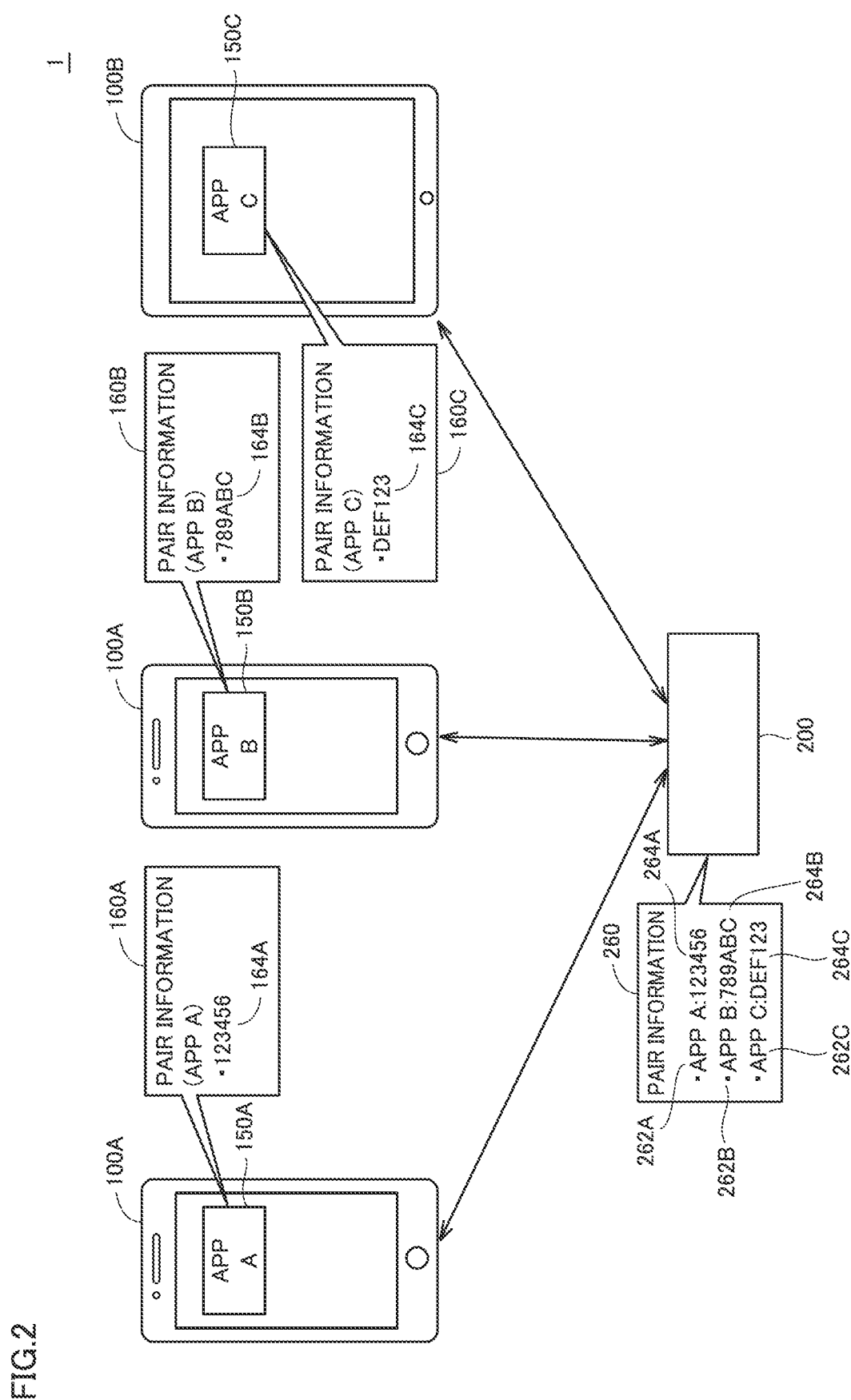
FIG. 2 shows exemplary illustrative non-limiting drawing illustrating overview of a communication system according to the present embodiment.

Referring to FIG. 2, by way of example, pair information 260 of peripheral terminal 200 includes identification information 264 brought in correspondence with each application 150. In the example shown in FIG. 2, pair information 260 includes (1) a set of application type information 262A (indicating application 150A) and corresponding identification information 264A, (2) a set of application type information 262B (indicating application 150B) and corresponding identification information 264B, and (3) a set of application type information 262C (indicating application 150C) and corresponding identification information 264C.

Each of applications 150A, 150B, and 150C includes as pair information 160, identification information 164 identical in value to identification information 264 included in pair information 260. More specifically, application 150A of central terminal 100A includes as pair information 160A, identification information 164A identical in value to identification information 264A in pair information 260. Application 150B of central terminal 100A includes as pair information 160B, identification information 164B identical in value to identification information 264B in pair information 260. Application 150C of central terminal 100B includes as pair information 160C, identification information 164C identical in value to identification information 264C in pair information 260.

As shown in FIG. 2, connection can be managed for each application 150 by checking pair information 160 of central terminal 100 and pair information 260 of peripheral terminal 200 against each other. At this time, application 150 may be executed in any central terminal 100.

The "pair information" herein can also be concluded as information for (substantially) uniquely determining combination of connection between specific application 150 executed in any central terminal 100 (or specific central terminal 100) and specific peripheral terminal 200.

Identification information included in "pair information" includes unique information that allows combination for connection to uniquely be specified and allows combinations to be distinguished from each other. Therefore, not only type information alone of application 150 itself or an address alone of central terminal 100 but also, for example, a randomly determined value (a random number) can be used as identification information. In addition, unique information that substantially allows distinction between combinations from each other may be generated as appropriate.

Pair information 160 and pair information 260 are generated or updated at the time of connection of central terminal 100 that executes any application to peripheral terminal 200. Details of processing involved with generation and update of pair information 160 and pair information 260 will be described later.

[B. Exemplary Hardware Configuration]

An exemplary hardware configuration of an apparatus included in communication system 1 according to the present embodiment will now be described.

(b1: Central Terminal 100)

Figure 3:
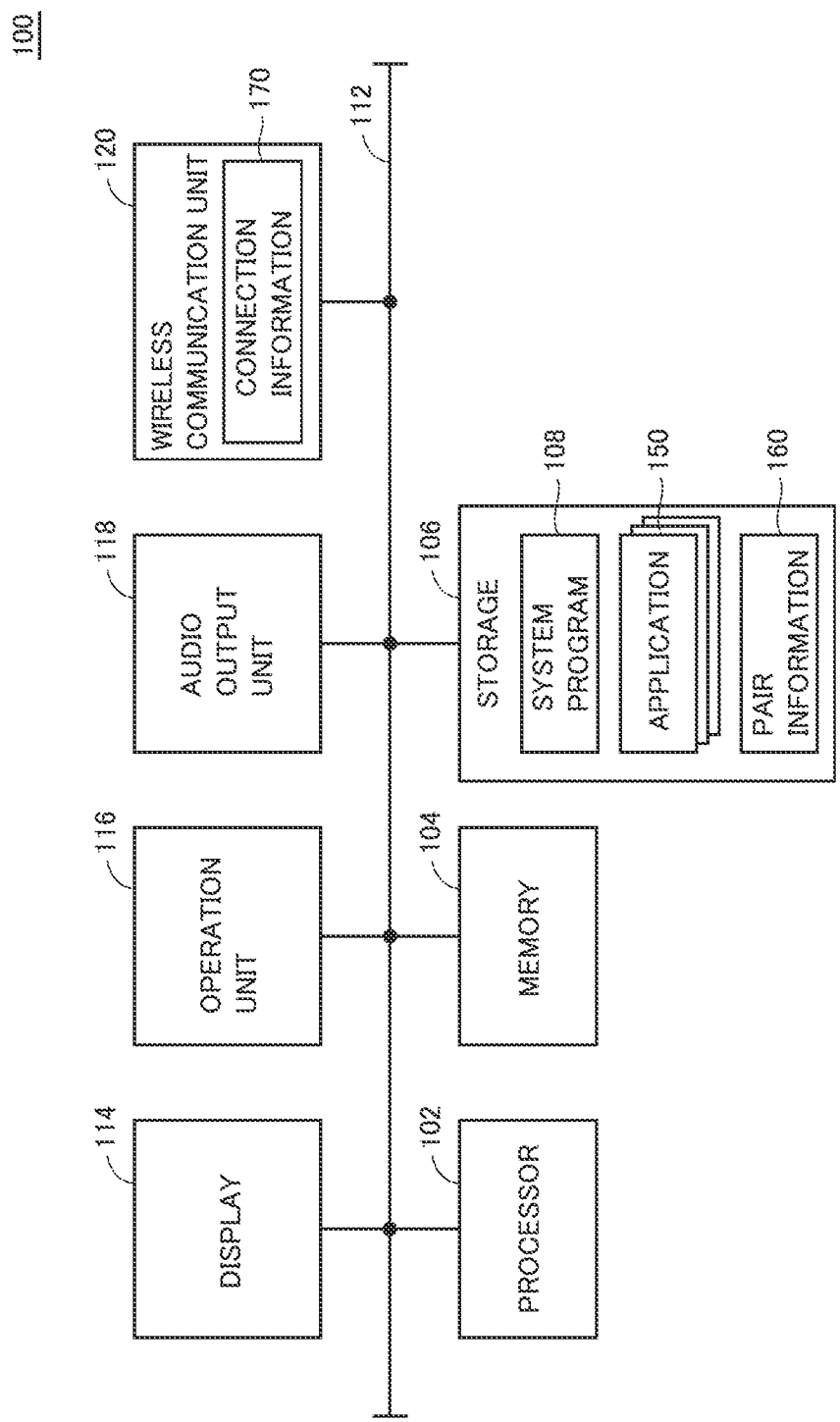
FIG. 3 shows an exemplary illustrative non-limiting drawing illustrating an exemplary hardware configuration of a central terminal included in the communication system according to the present embodiment.

Referring to FIG. 3, central terminal 100 represents an exemplary computer and includes a processor 102, a memory 104, a storage 106, a display 114, an operation unit 116, an audio output unit 118, and a wireless communication unit 120. These components are connected to one another to communicate data through a bus 112. Processor 102 is a processing entity (processing means) that performs processing provided by central terminal 100. Processor 102 reads a system program 108 and application 150 stored in storage 106, develops them on memory 104, and performs various types of information processing as will be described later.

System program 108 includes an instruction code for performing various types of processing including communication processing which will be described later. In other words, system program 108 includes a communication program according to the present embodiment.

Memory 104 is any storage device (storage medium) that can be accessed by processor 102, and implemented, for example, by a volatile storage device such as a dynamic random access memory (DRAM) or a static random access memory (SRAM).

Storage 106 is implemented, for example, by a non-volatile storage medium such as a hard disk or a flash memory. Storage 106 may be implemented, for example, by a storage medium attachable to and removable from central terminal 100 such as an optical disc and a cartridge. In this case, a combination of central terminal 100 and any storage medium may implement a communication apparatus.

In storage 106, system program 108, one or more applications 150, and pair information 160 are stored. Pair information 160 may be stored as an individual file for each application 150.

Display 114 shows an image generated as a result of information processing performed by processor 102. An image received from another apparatus may also be shown on display 114. A plurality of displays 114 may be provided. Alternatively, central terminal 100 may be configured to use one or more external displays.

Operation unit 116 accepts an operation from a user of central terminal 100. Operation unit 116 includes, for example, a push button, a control lever, a touch panel, a mouse, and the like. Operation unit 116 may be a game controller that is separate from central terminal 100 and connected through a wire or wirelessly.

Audio output unit 118 provides voice and sound from central terminal 100 to a user.

Wireless communication unit 120 transmits and receives data to and from peripheral terminal 200 through a wireless signal. Wireless communication unit 120 implements wireless communication in conformity with Bluetooth® by way of example. Connection information 170 can be stored in wireless communication unit 120. In other words, wireless communication unit 120 includes a storage in which, when connection to peripheral terminal 200 is established, an address of connected peripheral terminal 200 (connection information 170) is stored.

Processor 102 may perform the entirety or a part of processing by wireless communication unit 120.

Though FIG. 3 shows central terminal 100 as an integrated apparatus, the central terminal may be implemented as an assembly of a plurality of apparatuses. In other words, central terminal 100 may be implemented by combination of a plurality of independent apparatuses. For example, a configuration composed of a main body including hardware corresponding to processor 102, memory 104, and storage 106 and a terminal including hardware corresponding to display 114, operation unit 116, and audio output unit 118 may be adopted.

At least a part of information processing performed in central terminal 100 may be performed discretely by another apparatus or a plurality of other apparatuses arranged as being distributed over a network (a wide area network and/or a local network).

(b2: Peripheral Terminal 200)

Figure 4:
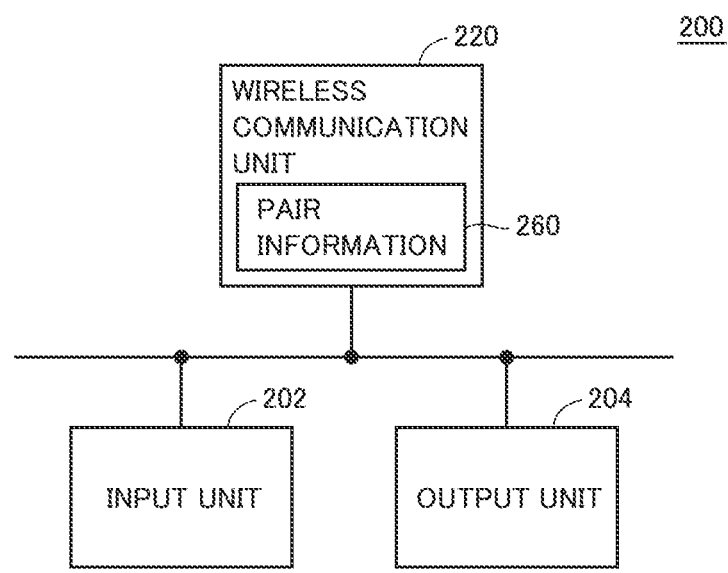
FIG. 4 shows an exemplary illustrative non-limiting drawing illustrating an exemplary hardware configuration of a peripheral terminal included in the communication system according to the present embodiment.

Referring to FIG. 4, peripheral terminal 200 represents an exemplary computer and includes a wireless communication unit 220. Peripheral terminal 200 may include an input unit 202 and an output unit 204.

Wireless communication unit 220 transmits and receives data to and from central terminal 100 through a wireless signal. More specifically, wireless communication unit 220 transmits input information from input unit 202 or the like to central terminal 100 and gives a command from central terminal 100 to output unit 204 or the like. Wireless communication unit 220 implements wireless communication in conformity with Bluetooth® by way of example.

Wireless communication unit 220 includes a storage in which identification information 264 brought in correspondence for each application 150 executed in central terminal 100 is stored as pair information 260. "First information" herein includes identification information 264, and includes, for example, identification information 264 alone and a set of application type information 262 and identification information 264.

Input unit 202 obtains various types of information. Input unit 202 includes a device for obtaining operation information from a user, such as a push button, a control lever, a touch panel, or a mouse. Input unit 202 includes a device for obtaining various types of information relating to peripheral terminal 200, such as a vibration sensor (an acceleration sensor), a temperature sensor, a pressure sensor, or a global positioning system (GPS) receiver.

Output unit 204 provides various types of information to a user. Output unit 204 includes, for example, a device that provides visual information, such as a display or a light emitting diode (LED), a device that provides auditory information, such as a speaker or a buzzer, and a device that provides tactile information, such as a vibrator or an electrothermal element.

(b3: Others)

Processing performed in central terminal 100 and/or peripheral terminal 200 may be implemented by execution of a program by the processor, or a part or the entirety thereof may be implemented by hard-wired circuitry such as a system on chip (SoC), an application specific integrated circuit (ASIC), or a field programmable gate array (FPGA).

[C. Functional Configuration]

Figure 5:
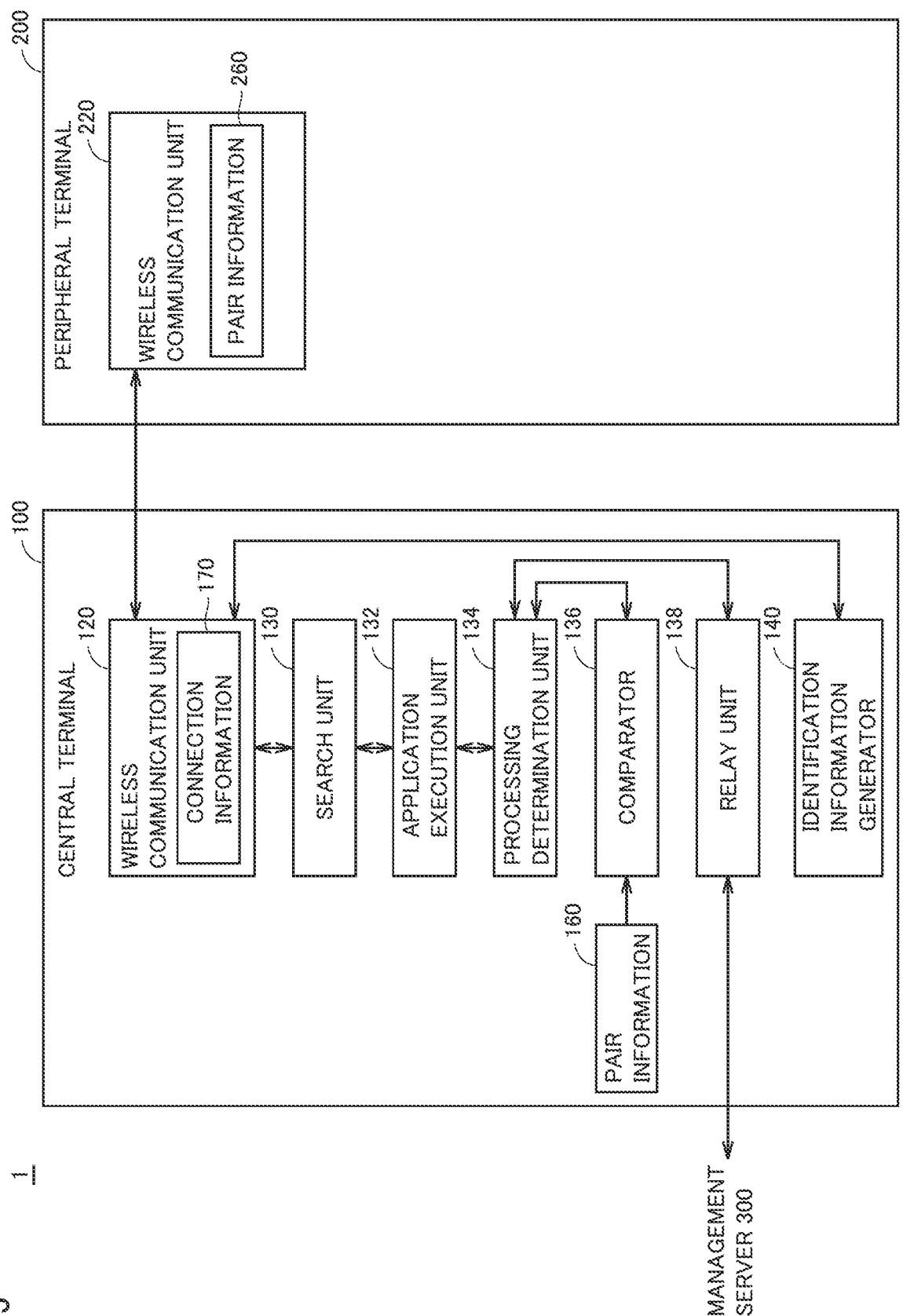
FIG. 5 shows an exemplary illustrative non-limiting drawing illustrating an exemplary functional configuration of the communication system according to the present embodiment.

Referring to FIG. 5, central terminal 100 includes, as its functional configuration, a search unit 130, an application execution unit 132, a processing determination unit 134, a comparator 136, a relay unit 138, and an identification information generator 140. Such a functional configuration is typically implemented by execution of system program 108 and/or application 150 by processor 102 of central terminal 100.

Search unit 130 receives an advertisement transmitted from peripheral terminal 200 and searches for peripheral terminal 200 to be connected.

Application execution unit 132 executes one or more applications 150. A part of application execution unit 132 may be implemented by an instruction code included in application 150.

Processing determination unit 134 determines processing involved with data communication with peripheral terminal 200 based on a result of comparison between identification information 164 brought in correspondence with running application 150 and identification information 264 received from peripheral terminal 200. Examples of processing involved with determined data communication include continuation of data communication with peripheral terminal 200, stop of data communication, a notification to the effect that peripheral terminal 200 has not been registered, and registration of pair information for the first time. Specific exemplary processing will be described later.

Comparator 136 compares identification information 164 brought in correspondence with running application 150 and identification information 264 received from peripheral terminal 200 with each other. A result of comparison by comparator 136 is provided to processing determination unit 134.

Relay unit 138 transmits identification information 264 received from peripheral terminal 200 to a management server 300 and receives a result of comparison from management server 300. Management server 300 compares identification information 164 brought in correspondence with running application 150 and identification information 264 received from peripheral terminal 200 with each other. Details of management server 300 will be described later with reference to FIGS. 8 to 15.

Identification information generator 140 generates identification information 164 and identification information 264 to be used as pair information 160 and pair information 260, respectively. More specifically, identification information generator 140 includes a random number generator, and determines identification information 164 and identification information 264 with the use of random numbers. Identification information generator 140 may generate application type information indicating a type of application 150 executed in central terminal 100.

Peripheral terminal 200 includes wireless communication unit 220. Wireless communication unit 220 includes a transmission unit that transmits identification information 264 or the like stored in wireless communication unit 220 (storage) in response to a request from application 150 executed in central terminal 100.

[D. Processing Procedure]

An exemplary processing procedure in communication system 1 according to the present embodiment will now be described.

Figure 6:
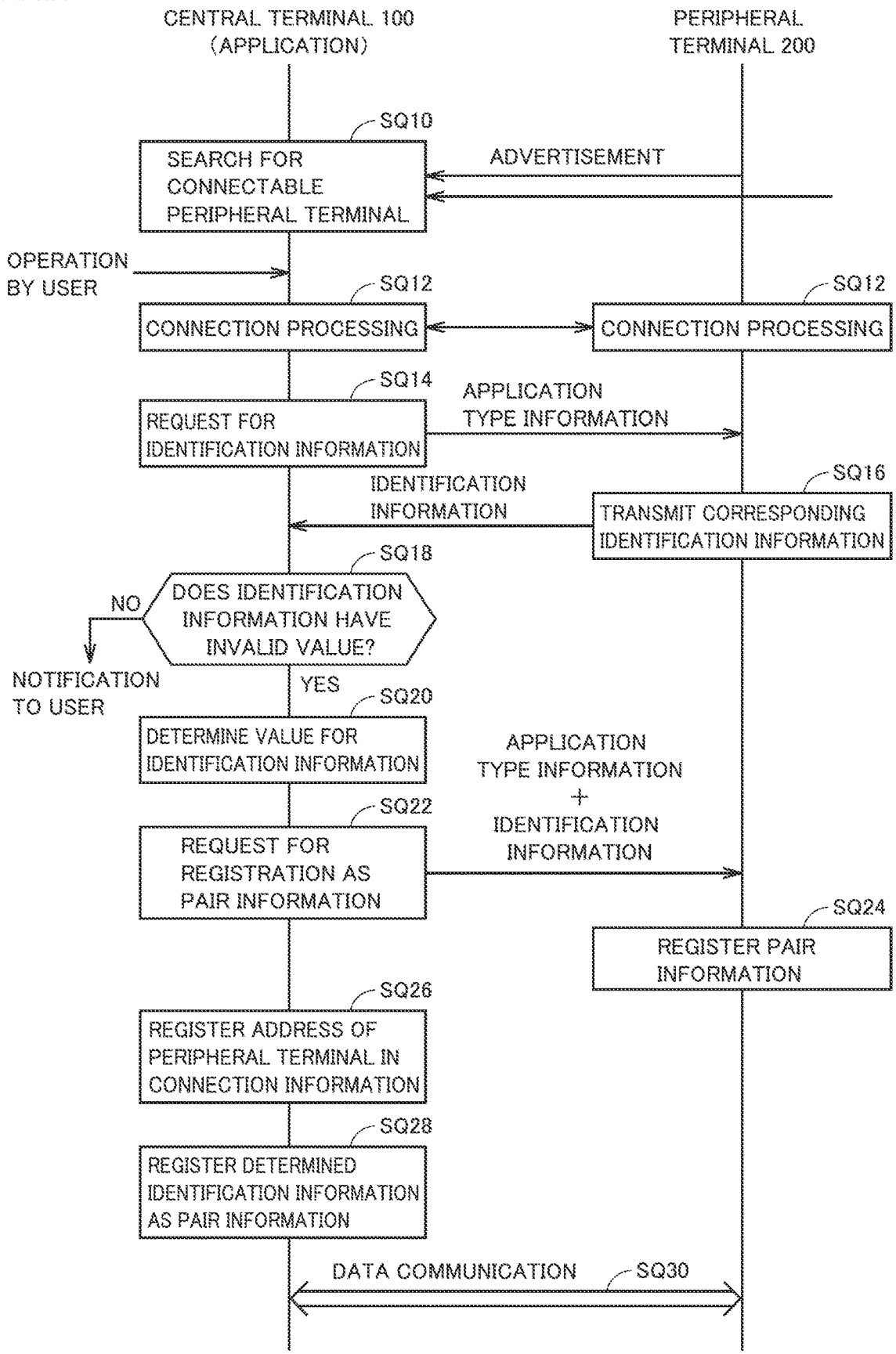
FIG. 6 shows an exemplary illustrative non-limiting sequence chart illustrating an exemplary processing procedure in connection for the first time between a central terminal and a peripheral terminal in the communication system according to the present embodiment.

FIG. 6 shows a processing procedure in establishing connection for the first time between central terminal 100 that is executing any application and peripheral terminal 200. It is assumed that central terminal 100 is executing application 150 in the processing procedure shown in FIG. 6.

Referring to FIG. 6, central terminal 100 searches for connectable peripheral terminal 200 (sequence SQ10). Search for connectable peripheral terminal 200 may be started in response to an operation by a user in application 150 that is being executed, or may automatically be started at prescribed timing. Typically, central terminal 100 scans advertisements from peripheral terminals 200 present therearound to find connectable peripheral terminal 200. When a plurality of peripheral terminals 200 are present around central terminal 100, central terminal 100 receives an advertisement from each of peripheral terminals 200. In principle, the advertisement itself does not include pair information 260 (or identification information 264 (first information)).

Central terminal 100 starts processing for connection to designated peripheral terminal 200 among connectable peripheral terminals 200 in response to an operation by the user (sequence SQ12).

In succession, central terminal 100 requests connected peripheral terminal 200 to give identification information 264 held therein (sequence SQ14). At this time, application type information indicating the type of application 150 that is being executed is transmitted from central terminal 100 to peripheral terminal 200.

Peripheral terminal 200 transmits identification information 264 corresponding to application type information 262 the same as the designated application type information, by referring to pair information 260 thereof (sequence SQ16). When connection is established for the first time, corresponding identification information 264 has not been registered in pair information 260, and therefore an invalid value is transmitted as identification information 264.

Thus, in sequence SQ14 and sequence SQ16, in response to a request from application 150 executed in central terminal 100, peripheral terminal 200 transmits second information (for example, identification information 264) based on the first information (for example, identification information 264) brought in correspondence with running application 150 on central terminal 100.

The "second information" herein includes information including identification information 264 or information generated based on identification information 264. The information including identification information 264 includes, for example, identification information 264 alone and a set of application type information 262 and identification information 264. Therefore, for example, not only identification information 264 but also a set of application type information 262 and identification information 264 may be transmitted as the "second information" to central terminal 100. This processing is also similar for sequence SQ48 (FIGS. 7, 10, and 13) which will be described later.

Central terminal 100 determines whether or not identification information 264 from peripheral terminal 200 has an invalid value (sequence SQ18).

When identification information 264 from peripheral terminal 200 has a valid value (NO in sequence SQ18), some pair information 260 has previously been registered in peripheral terminal 200, and therefore the user is notified of whether or not update of pair information 260 is necessary. As a prescribed operation by the user is performed in response to this notification, processing in sequence SQ20 or later may be continued. In this case, pair information 260 registered in peripheral terminal 200 is updated. At this time, various types of data stored in peripheral terminal 200 such as information on the user or records of use of peripheral terminal 200 may be erased.

In contrast, when identification information 264 from peripheral terminal 200 has an invalid value (YES in sequence SQ18), central terminal 100 determines a value for identification information 264 to be registered in peripheral terminal 200 (sequence SQ20). The value for identification information 264 may randomly be determined. Then, central terminal 100 requests connected peripheral terminal 200 to register determined identification information 264 as pair information 260 (sequence SQ22). At this time, application type information 262 and identification information 264 are transmitted from central terminal 100 to peripheral terminal 200.

In response to a request for registration of identification information 264, peripheral terminal 200 registers designated type information 262 and identification information 264 as pair information 260 (sequence SQ24). Identification information 264 brought in correspondence for each application executed in central terminal 100 is thus stored in peripheral terminal 200 as pair information 260.

On the other hand, central terminal 100 registers an address (for example, a Bluetooth® device address) of connected peripheral terminal 200 in connection information (sequence SQ26). Central terminal 100 registers as pair information 160, identification information 164 identical in value to determined identification information 264, as pair information 260 of the application that is being executed (sequence SQ28).

As a series of processing involved with connection for the first time as above is completed, data communication between central terminal 100 and peripheral terminal 200 is started (sequence SQ30).

Figure 7:
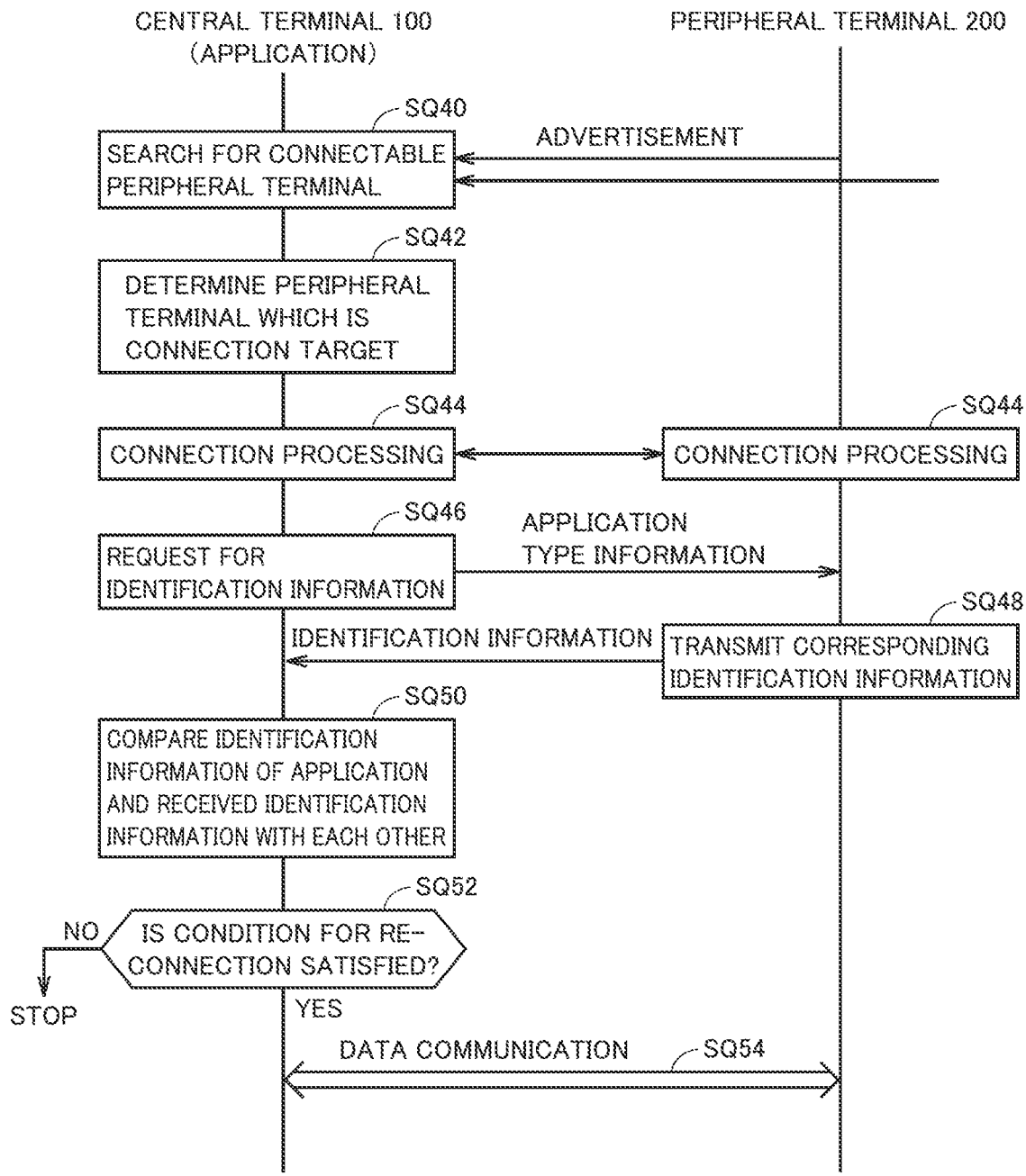
FIG. 7 shows an exemplary illustrative non-limiting sequence chart illustrating an exemplary processing procedure in re-connection between the central terminal and the peripheral terminal in the communication system according to the present embodiment.

FIG. 7 shows a processing procedure in establishing connection between central terminal 100 that is executing any application and peripheral terminal 200 for the second time or later. It is assumed that central terminal 100 is executing application 150 in the processing procedure shown in FIG. 7.

Referring to FIG. 7, central terminal 100 searches for connectable peripheral terminal 200 (sequence SQ40). Search for connectable peripheral terminal 200 may be started in response to an operation by the user in application 150 that is being executed or may automatically be started at prescribed timing.

Central terminal 100 determines as a connection target, peripheral terminal 200 having an address the same as the address registered in connection information 170 among connectable peripheral terminals 200 (sequence SQ42). Then, central terminal 100 starts processing for connection to determined peripheral terminal 200 (sequence SQ44).

In succession, central terminal 100 requests connected peripheral terminal 200 to give identification information 264 held therein (sequence SQ46). At this time, application type information indicating the type of the application that is being executed is transmitted from central terminal 100 to peripheral terminal 200.

Thus, when the address of peripheral terminal 200 which is the sender of the received advertisement is included in addresses (connection information 170) stored in wireless communication unit 120, central terminal 100 starts processing for connection to peripheral terminal 200 which is the sender, and after connection is established, central terminal 100 transmits the request for identification information 264 to peripheral terminal 200.

In response to such a request from the application executed in central terminal 100, peripheral terminal 200 transmits identification information 264 corresponding to application type information 262 the same as the designated application type information, by referring to pair information 260 thereof (sequence SQ48).

Central terminal 100 compares identification information 164 brought in correspondence with the running application and identification information 264 received from peripheral terminal 200 with each other (sequence SQ50). Then, central terminal 100 determines whether or not a result of comparison between identification information 164 brought in correspondence with the running application and identification information 264 received from peripheral terminal 200 satisfies a predetermined condition for re-connection (sequence SQ52). For example, the condition for re-connection includes matching of identification information 264 given back from peripheral terminal 200 with identification information 164 of central terminal 100.

When the result of comparison does not satisfy the condition for re-connection (NO in sequence SQ52), connection processing is stopped. In contrast, when the result of comparison satisfies the condition for re-connection (YES in sequence SQ52), data communication between central terminal 100 and peripheral terminal 200 is started (sequence SQ54).

When the result of comparison does not satisfy the condition for re-connection (NO in sequence SQ52), instead of or in addition to stop of the connection processing, such processing as disconnection from corresponding peripheral terminal 200, notification to the effect that peripheral terminal 200 has not been registered, or switching to processing for connection for the first time may be performed. For example, when switching to processing for connection for the first time is made, various types of data stored in peripheral terminal 200 such as information on the user or records of use of peripheral terminal 200 may be erased.

Thus, central terminal 100 determines processing involved with data communication with peripheral terminal 200 based on a result of comparison between third information (for example, identification information 164) brought in correspondence with running application 150 and the second information received from peripheral terminal 200.

As described above, the "second information" herein includes information including identification information 264 or information generated based on identification information 264. Then, the "third information" to be compared includes information including identification information 264 or information generated based on identification information 264, and it is, for example, information the same as the second information. The "third information" may be different from the second information. In any case, the "third information" includes information that can be compared with the "second information."

[E. First Modification]

Though an exemplary implementation in which central terminal 100 performs processing involved with management of pair information is shown in the description above, without being limited as such, the entirety or a part of necessary processing may be performed by using a computing resource (typically, a computing resource on the cloud) separate from central terminal 100. A form in which the management server performs a part of processing involved with management of pair information will be illustrated below.

Figure 8:
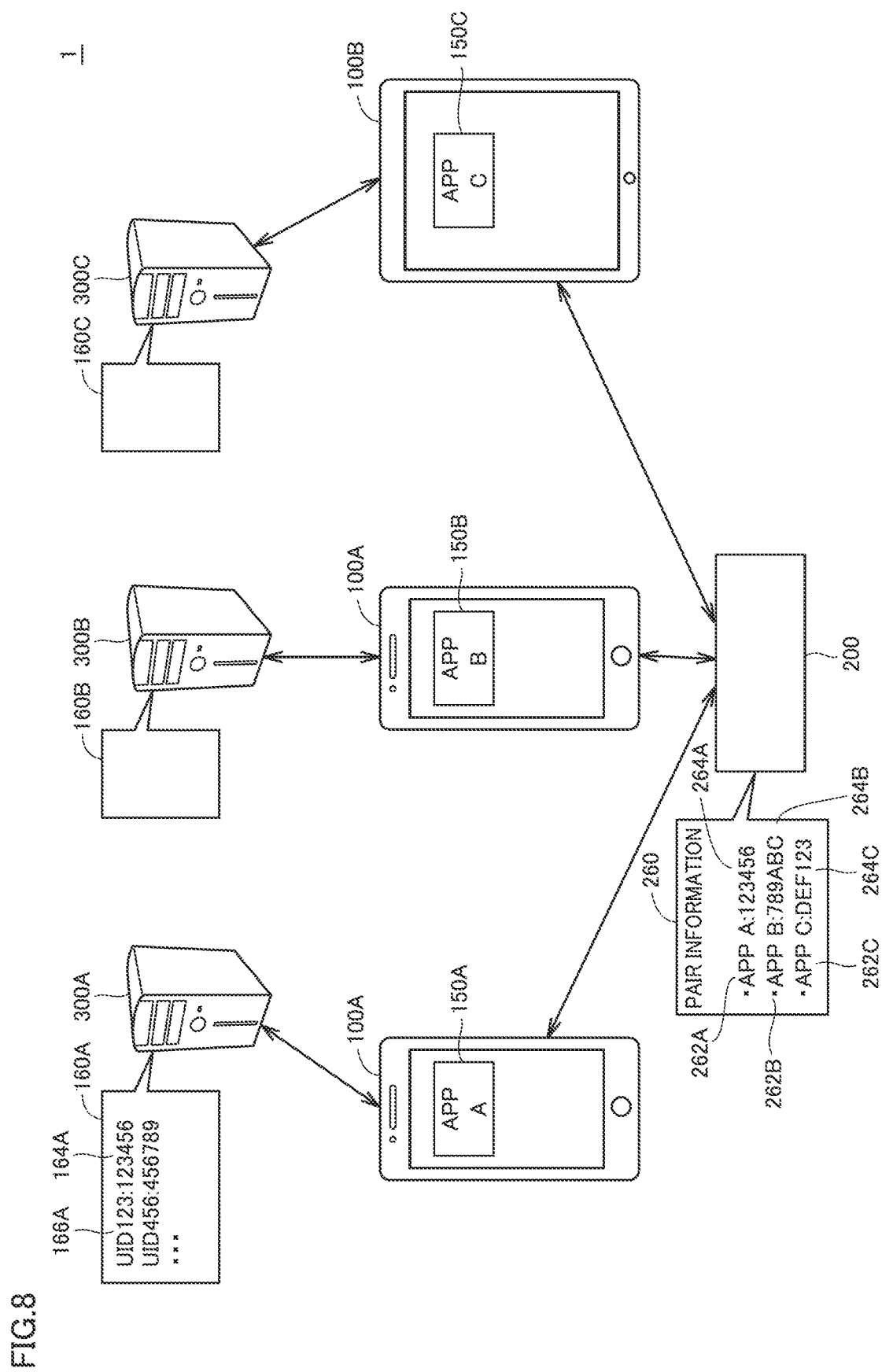
FIG. 8 shows an exemplary illustrative non-limiting drawing illustrating overview of the communication system according to a first modification of the present embodiment.

Referring to FIG. 8, communication system 1 includes management servers 300A, 300B, 300C, . . . (which may also collectively be referred to as "management server 300" below) in addition to central terminal 100 and peripheral terminal 200.

In an exemplary configuration shown in FIG. 8, central terminal 100 functions as an apparatus that accepts an operation by a user, and central terminal 100 and management server 300 can be regarded as an integrated processing entity (a first terminal) (which is similar in first to third modifications below).

Management server 300 is provided for each application. For example, management servers 300A, 300B, and 300C are provided in correspondence with applications 150A, 150B, and 150C, respectively. Management server 300 in place of central terminal 100 manages pair information 160.

Pair information 160 managed by management server 300 includes one or more sets of user identification information 166 and identification information 164. More specifically, management server 300A manages pair information 160A relating to application 150A. Pair information 160A includes one or more sets of user identification information 166A and identification information 164A. Similarly, management server 300B manages pair information 160B relating to application 150B, and management server 300C manages pair information 160C relating to application 150C. Information included in pair information 160B and pair information 160C is also similar to that of pair information 160A.

As will be described later, management server 300 creates, changes, or deletes pair information 160 in accordance with a notification from central terminal 100 and performs processing such as authentication of identification information from peripheral terminal 200.

User identification information 166 is any information that allows management server 300 to uniquely distinguish a user. For example, a user account, a randomly determined value (a random number), identification information of central terminal 100, or identification information of an application to be executed which is different for each central terminal 100 can be employed as user identification information 166. User identification information 166 does not have to identify the user himself/herself.

Management server 300 is typically implemented by one or more general-purpose computers. Therefore, description of an exemplary hardware configuration of management server 300 will not be repeated.

Figure 9:
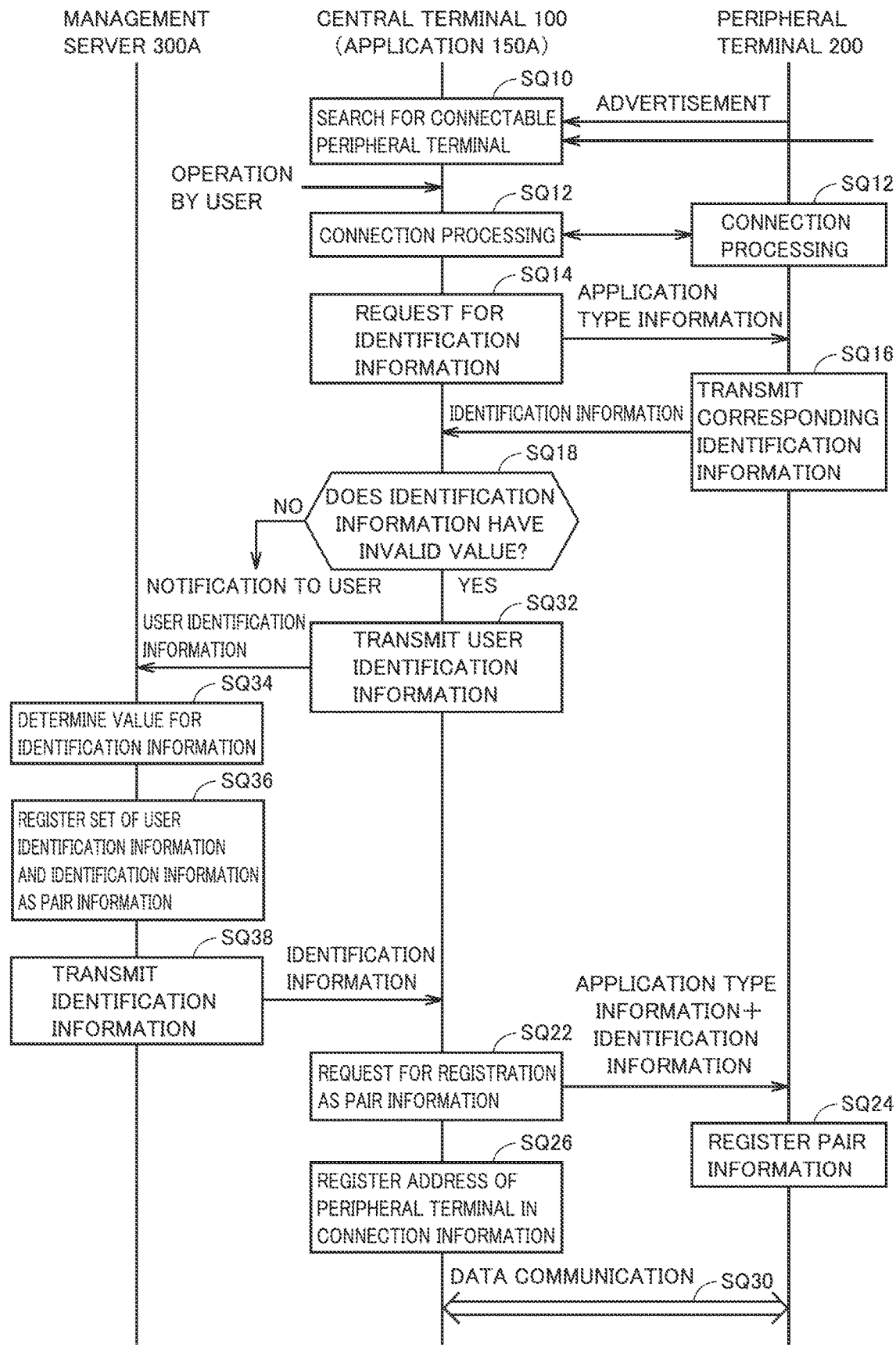
FIG. 9 shows an exemplary illustrative non-limiting sequence chart illustrating an exemplary processing procedure in connection for the first time between the central terminal and the peripheral terminal in the communication system according to the first modification of the present embodiment.

Since a processing procedure shown in FIG. 9 is similar to the processing procedure shown in FIG. 6, only differences will be described. More specifically, processing in sequences SQ34 to SQ38 is performed instead of the processing in sequence SQ20 shown in FIG. 6. Sequence SQ28 is eliminated.

When identification information 264 from peripheral terminal 200 has an invalid value (YES in sequence SQ18), central terminal 100 transmits user identification information 166 to management server 300 (sequence SQ32).

When management server 300 receives user identification information 166 from peripheral terminal 200, it determines a value for identification information 164 corresponding to received user identification information 166 (sequence SQ34) and registers a set of user identification information 166 and identification information 164 as pair information 160 (sequence SQ36). When identification information 164 brought in correspondence with the same user identification information 166 has already been registered, management server 300 updates the already registered information with a presently determined value. At this time, various types of data stored in peripheral terminal 200 such as information on the user or records of use of peripheral terminal 200 may be erased.

In other words, in a first modification, identification information generator 140 (see FIG. 5) that generates identification information 164 and identification information 264 used as pair information 160 and pair information 260, respectively, is provided in management server 300.

In succession, management server 300 transmits identification information 164 included in registered user identification information 166 to peripheral terminal 200 (sequence SQ38). Then, central terminal 100 requests connected peripheral terminal 200 to register identification information 264 the same as identification information 164 received from management server 300 as pair information 260 (sequence SQ22). At this time, application type information 262 in addition to identification information 264 may also be transmitted from central terminal 100 to peripheral terminal 200.

As a series of processing involved with connection for the first time as above is completed, data communication between central terminal 100 and peripheral terminal 200 is started.

Figure 10:
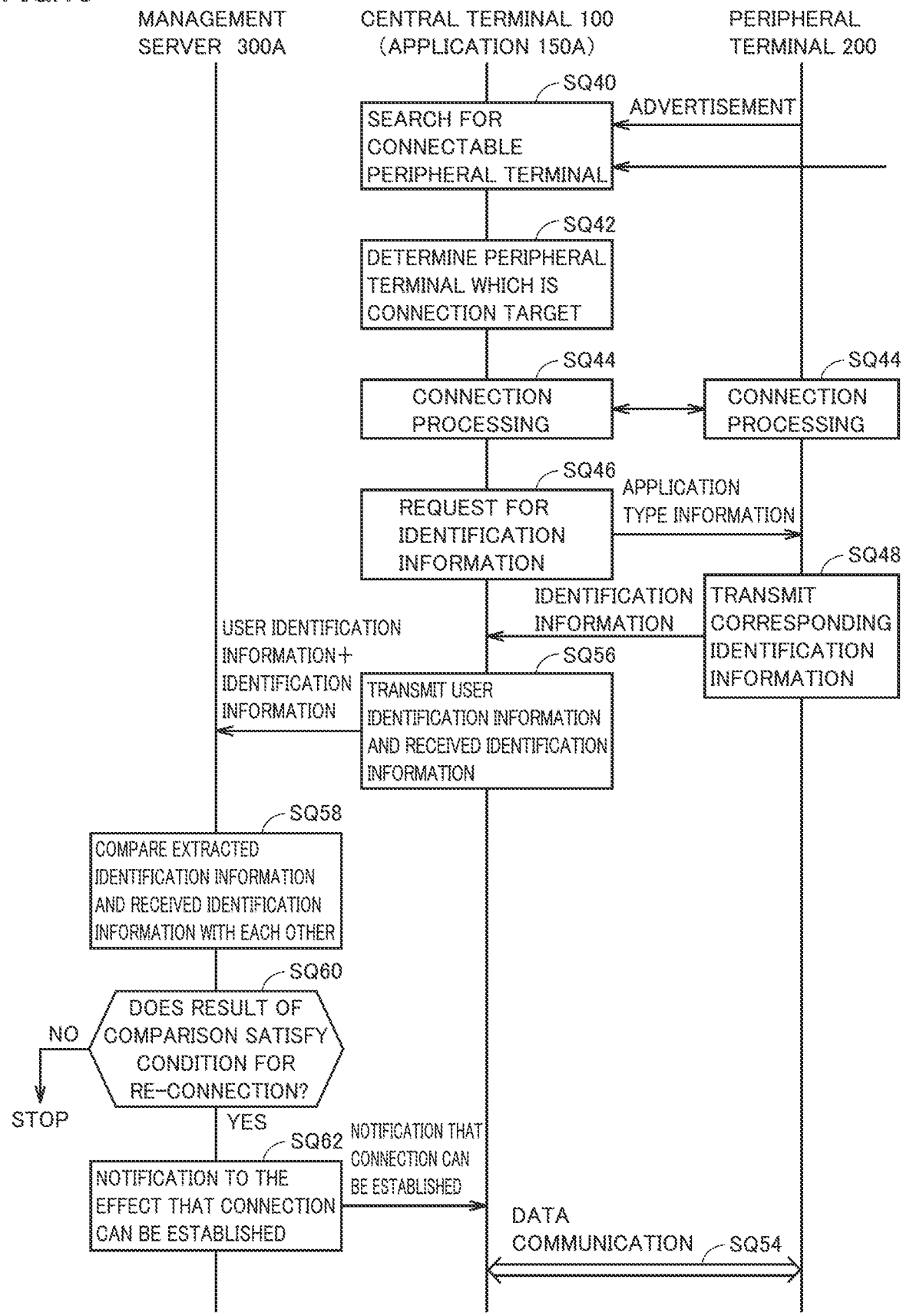
FIG. 10 shows an exemplary illustrative non-limiting sequence chart illustrating an exemplary processing procedure in re-connection between the central terminal and the peripheral terminal in the communication system according to the first modification of the present embodiment.

Since a processing procedure shown in FIG. 10 is similar to the processing procedure shown in FIG. 7, only differences will be described. More specifically, processing in sequences SQ56 to SQ62 is performed instead of the processing in sequences SQ50 and SQ52 shown in FIG. 7.

When central terminal 100 receives identification information 264 from peripheral terminal 200, it transmits user identification information 166 and received identification information 264 to management server 300 (sequence SQ56).

Management server 300 extracts identification information 164 corresponding to user identification information 166 received from central terminal 100 by referring to registered pair information 160, and compares extracted identification information 164 and received identification information 264 with each other (sequence SQ58). Then, management server 300 determines whether or not a result of comparison satisfies a predetermined condition for re-connection (sequence SQ60). For example, the condition for re-connection includes matching of extracted identification information 164 with received identification information 264.

When the result of comparison does not satisfy the condition for re-connection (NO in sequence SQ60), connection processing is stopped. In contrast, when the result of comparison satisfies the condition for re-connection (YES in sequence SQ60), management server 300 notifies central terminal 100 that connection can be established (sequence SQ62). Data communication between central terminal 100 and peripheral terminal 200 is thus started (sequence SQ54).

When the result of comparison does not satisfy the condition for re-connection (NO in sequence SQ60), management server 300 may notify central terminal 100 that connection cannot be established. Instead of or in addition to the notification that connection cannot be established, switching to processing for connection for the first time may be made. At this time, various types of data stored in peripheral terminal 200 such as information on the user or records of use of peripheral terminal 200 may be erased. Alternatively, unless central terminal 100 receives the notification from management server 300 within a prescribed time period (timeout), central terminal 100 may stop processing.

Management server 300 thus compares third information (for example, identification information 164) brought in correspondence with running application 150 on central terminal 100 and the second information received from peripheral terminal 200 with each other.

According to the configuration in the first modification, management server 300 rather than central terminal 100 manages pair information 160. Therefore, such a situation that rewriting of pair information 160 managed by central terminal 100 may affect the result of comparison between the third information and the second information can be avoided.

[F. Second Modification]

In the first modification described above, pair information 160 managed by management server 300 includes one or more sets of user identification information 166 and identification information 164. A peripheral terminal address 168 may further be brought in correspondence with each set included in such pair information 160.

Figure 11:
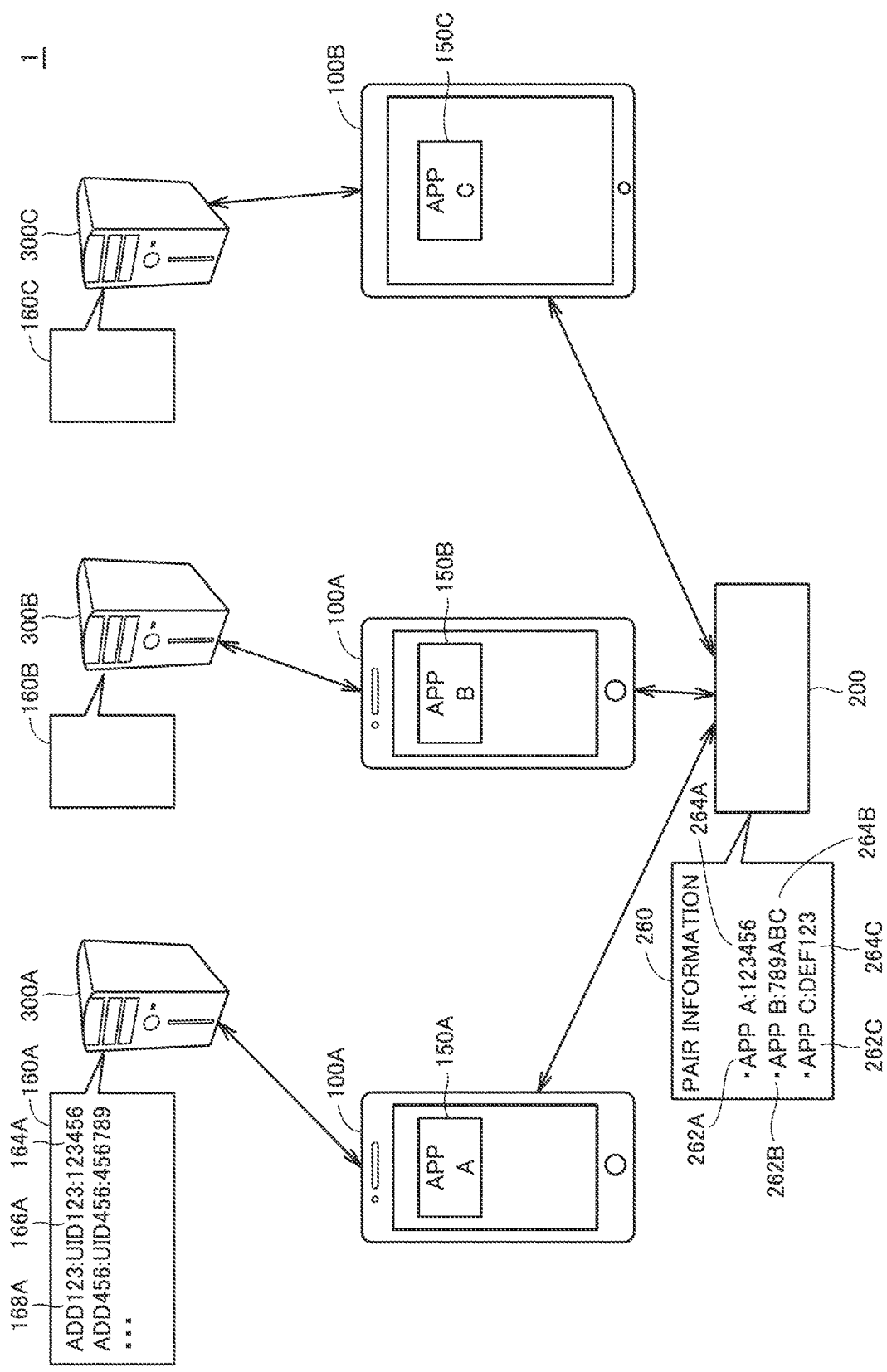
FIG. 11 shows an exemplary illustrative non-limiting drawing illustrating overview of the communication system according to a second modification of the present embodiment.

Referring to FIG. 11, pair information 160 managed by management server 300 includes one or more sets of peripheral terminal address 168, user identification information 166, and identification information 164. More specifically, management server 300A manages pair information 160A relating to application 150A. Pair information 160A includes one or more sets of a peripheral terminal address 168A, user identification information 166A, and identification information 164A. Similarly, management server 300B manages pair information 160B relating to application 150B, and management server 300C manages pair information 160C relating to application 150C. Information included in pair information 160B and pair information 160C is also similar to that in pair information 160A.

Peripheral terminal address 168 indicates an address of peripheral terminal 200 to which central terminal 100 which is a connection target is further connected. Peripheral terminal address 168 may include only a part of the address of peripheral terminal 200 or may be an address of peripheral terminal 200 to which any information has been added. Peripheral terminal address 168 may be a specific value calculated from the address of peripheral terminal 200.

Since pair information 160 shown in FIG. 11 includes peripheral terminal address 168, user identification information 166, and identification information 164, any of them may be defined as a search key. Typically, peripheral terminal address 168 is set as the search key.

Figure 12:
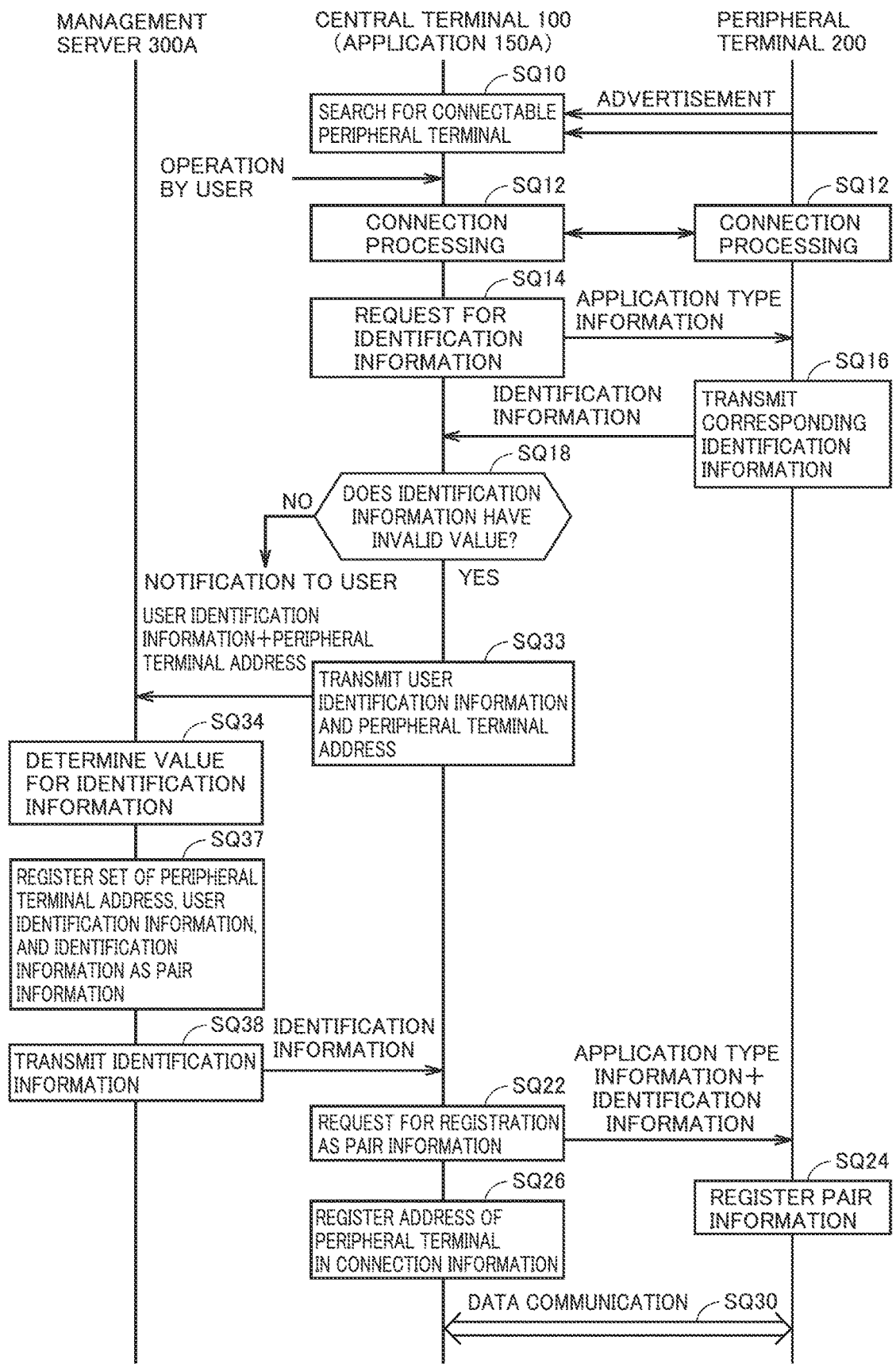
FIG. 12 shows an exemplary illustrative non-limiting sequence chart illustrating an exemplary processing procedure in connection for the first time between the central terminal and the peripheral terminal in the communication system according to the second modification of the present embodiment.

Since a processing procedure shown in FIG. 12 is similar to the processing procedure shown in FIG. 9, only differences will be described. More specifically, processing in sequences SQ33 and SQ37 is performed instead of the processing in sequences SQ32 and SQ36 shown in FIG. 9.

When identification information 264 from peripheral terminal 200 has an invalid value (YES in sequence SQ18), central terminal 100 transmits user identification information 166 and the address of peripheral terminal 200 (peripheral terminal address) to management server 300 (sequence SQ33). Central terminal 100 has already obtained the address of peripheral terminal 200 in the processing for connection to peripheral terminal 200 (sequence SQ12).

When management server 300 receives user identification information 166 and the peripheral terminal address from peripheral terminal 200, it determines a value for identification information 164 corresponding to user identification information 166 (sequence SQ34) and registers a set of peripheral terminal address 168, user identification information 166, and identification information 164 as pair information 160 (sequence SQ37). When identification information 164 brought in correspondence with the same peripheral terminal address 168 has already been registered, management server 300 updates the already registered information with a presently determined value. At this time, various types of data stored in peripheral terminal 200 such as information on the user or records of use of peripheral terminal 200 may be erased.

Figure 13:
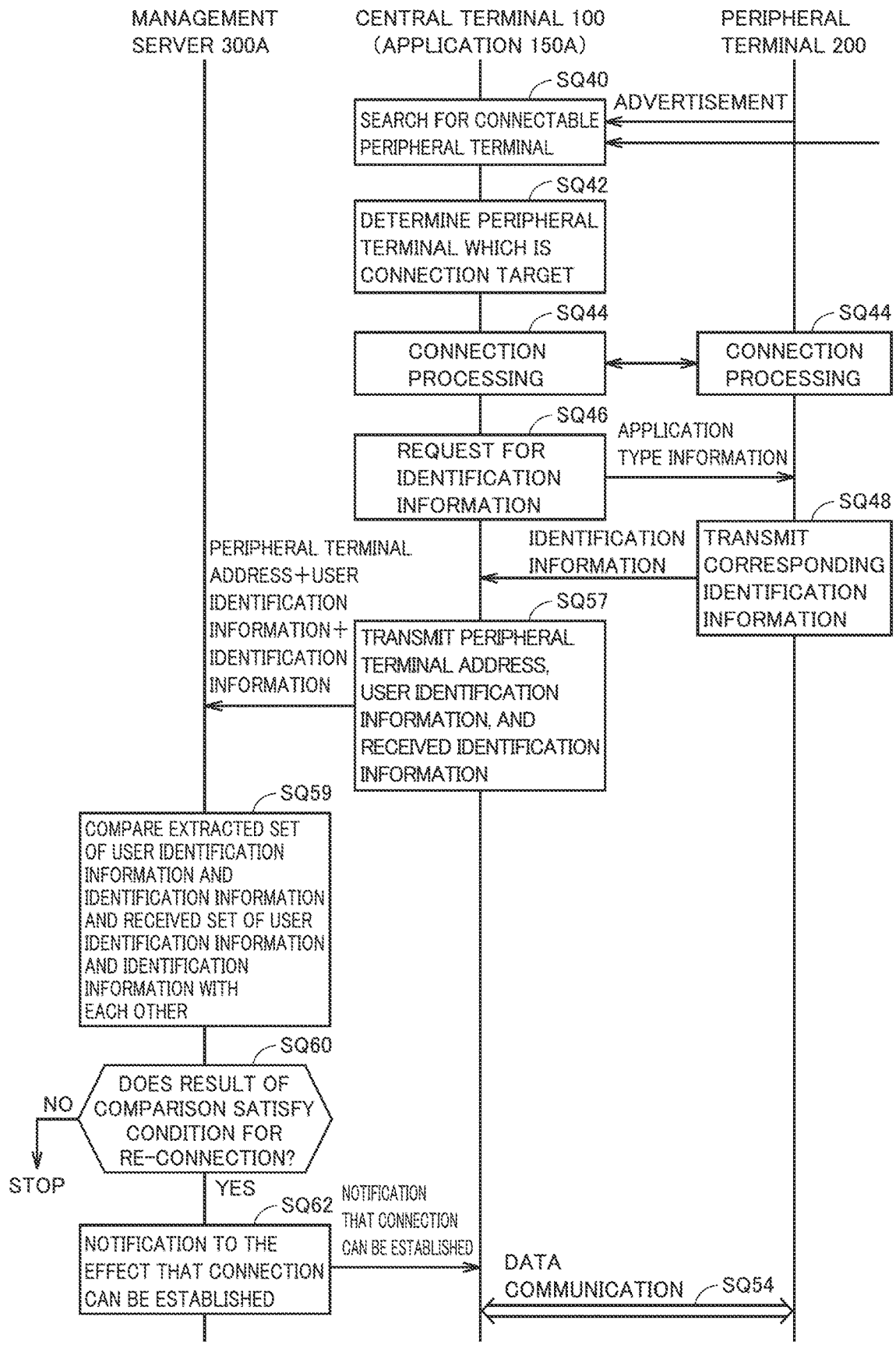
FIG. 13 shows an exemplary illustrative non-limiting sequence chart illustrating an exemplary processing procedure in re-connection between the central terminal and the peripheral terminal in the communication system according to the second modification of the present embodiment.

Since a processing procedure shown in FIG. 13 is similar to the processing procedure shown in FIG. 10, only differences will be described. More specifically, processing in sequences SQ57 and SQ59 is performed instead of the processing in sequences SQ56 and SQ58 shown in FIG. 10.

When central terminal 100 receives identification information 264 from peripheral terminal 200, it transmits received identification information 264 in addition to the address of peripheral terminal 200 (peripheral terminal address) and user identification information 166 to management server 300 (sequence SQ57). Central terminal 100 has already obtained the address of peripheral terminal 200 in the processing for connection to peripheral terminal 200 (sequence SQ44).

Management server 300 extracts, by referring to registered pair information 160, the set of user identification information 166 and identification information 164 corresponding to the peripheral terminal address received from central terminal 100 and compares the extracted set of user identification information 166 and identification information 164 with the received set of user identification information 166 and identification information 264 (sequence SQ59). Then, management server 300 determines whether or not a result of comparison satisfies a predetermined condition for re-connection (sequence SQ60). For example, the condition for re-connection includes matching of the extracted set of user identification information 166 and identification information 164 with the received set of user identification information 166 and identification information 264. When the result of comparison does not satisfy the condition for re-connection (NO in sequence SQ60), management server 300 may notify central terminal 100 that connection cannot be established. Instead of or in addition to the notification that connection cannot be established, switching to processing for connection for the first time may be made. At this time, various types of data stored in peripheral terminal 200 such as information on the user or records of use of peripheral terminal 200 may be erased.

According to the configuration in a second modification, management server 300 rather than central terminal 100 manages pair information 160. Therefore, such a situation that rewriting of pair information 160 managed by central terminal 100 may affect the result of comparison between the third information and the second information can be avoided.

According to the configuration in the second modification, identification information 164 is managed in correspondence with the set of peripheral terminal address 168 and user identification information 166. Therefore, for example, even when the address of peripheral terminal 200 stored in central terminal 100 is rewritten in an attempt to use peripheral terminal 200 different from the peripheral terminal used so far, pair information 260 stored in peripheral terminal 200 or the like can reliably be initialized.

[G. Third Modification]

Though a configuration in which an address of peripheral terminal 200 (peripheral terminal address 168) is included in pair information 160 is adopted in the second modification described above, absence of an error in peripheral terminal address 168 itself is preferably guaranteed. Therefore, an electronic signature generated from an address of peripheral terminal 200 may be obtained from peripheral terminal 200, absence of an error such as garbling in peripheral terminal 168 may be checked with the use of the obtained electronic signature, and then processing for registering pair information 160 may be performed.

Figure 14:
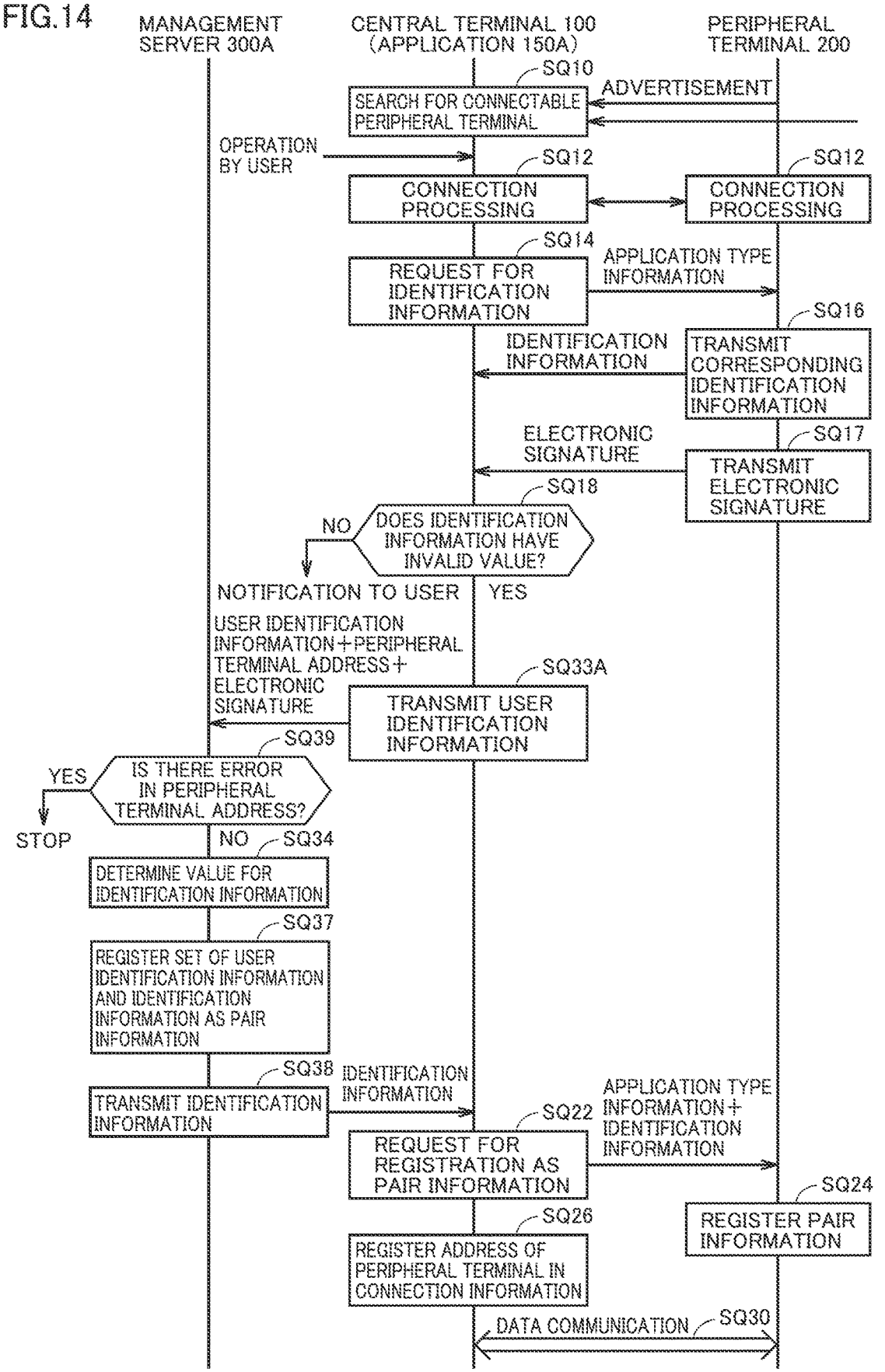
FIG. 14 shows an exemplary illustrative non-limiting sequence chart illustrating an exemplary processing procedure in connection for the first time between the central terminal and the peripheral terminal in the communication system according to a third modification of the present embodiment.

A processing procedure shown in FIG. 14 is addition of processing in sequences SQ17 and SQ39 to the processing procedure shown in FIG. 12 and replacement of the processing in sequence SQ33 with sequence SQ33A.

Peripheral terminal 200 transmits identification information 264 (sequence SQ16), and thereafter transmits an electronic signature 280 generated from the address thereof to central terminal 100 (sequence SQ17). Electronic signature 280 may be, for example, a hash value calculated by input of the address of the peripheral terminal into a prescribed hash function.

Electronic signature 280 may be transmitted from peripheral terminal 200 automatically after transmission of identification information 264 or in response to an explicit request from central terminal 100.

In sequence SQ33A, central terminal 100 transmits also electronic signature 280 to management server 300, in addition to user identification information 166 and the address of peripheral terminal 200 (peripheral terminal address).

Management server 300 determines whether or not there is an error in the received peripheral terminal address based on electronic signature 280 from central terminal 100 (sequence SQ39). More specifically, whether or not a value calculated by input of the received peripheral terminal address into a prescribed hash function matches with received electronic signature 280 is determined.

When there is an error in the received peripheral terminal address (YES in sequence SQ39), processing is stopped. When there is no error in the received peripheral terminal address (NO in sequence SQ39), processing in sequence SQ34 or later is performed.

Figure 15:
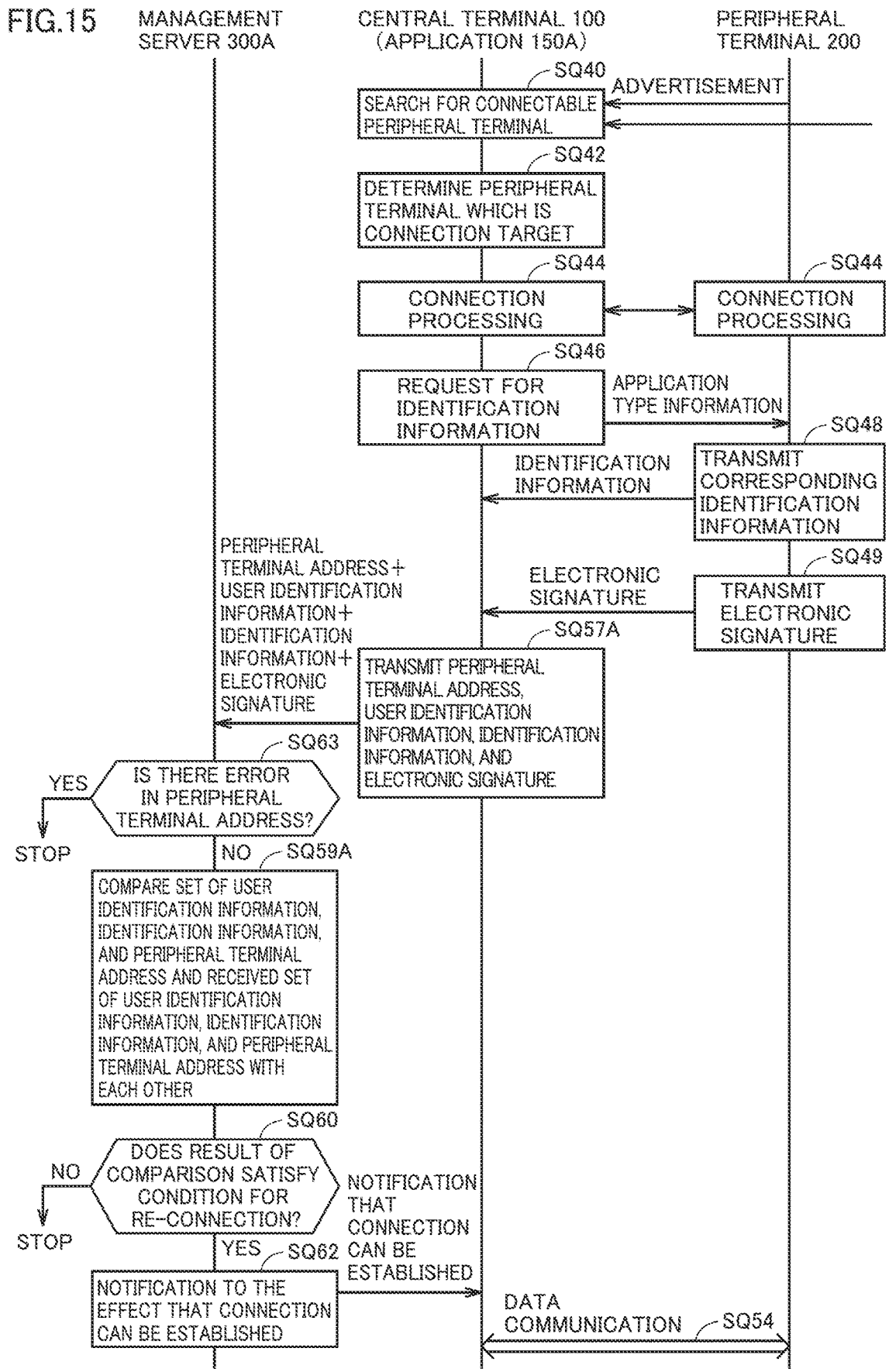
FIG. 15 shows an exemplary illustrative non-limiting sequence chart illustrating an exemplary processing procedure in re-connection between the central terminal and the peripheral terminal in the communication system according to the third modification of the present embodiment.

A processing procedure shown in FIG. 15 is addition of processing in sequences SQ49 and SQ63 to the processing procedure shown in FIG. 13 and replacement of the processing in sequences SQ57 and SQ59 with sequences SQ57A and SQ59A.

Peripheral terminal 200 transmits identification information 264 (sequence SQ48), and thereafter transmits electronic signature 280 generated from the address thereof to central terminal 100 (sequence SQ49).

Electronic signature 280 may be transmitted from peripheral terminal 200 automatically after transmission of identification information 264 or in response to an explicit request from central terminal 100.

In sequence SQ57A, central terminal 100 transmits also electronic signature 280 to management server 300 in addition to user identification information 166 and the address of peripheral terminal 200 (peripheral terminal address).

Management server 300 determines whether or not there is an error in the received peripheral terminal address based on electronic signature 280 from central terminal 100 (sequence SQ63).

When there is an error in the received peripheral terminal address (YES in sequence SQ63), processing is stopped. When there is no error in the received peripheral terminal address (NO in sequence SQ63), processing in sequence SQ59A or later is performed.

In sequence SQ59A, management server 300 extracts a set of user identification information 166, identification information 164, and peripheral terminal address 168 by referring to registered pair information 160, and compares the extracted set of user identification information 166, identification information 164, and peripheral terminal address 168 with the received set of user identification information 166, identification information 164, and peripheral terminal address 168 (sequence SQ59A).

According to the configuration in a third modification, in the event of occurrence of an error such as garbling in the address (peripheral terminal address) due to a trouble in hardware of peripheral terminal 200, such occurrence can be prevented from affecting management of the pair information.

[H. Exemplary User Interface]

An exemplary user interface provided in communication system 1 according to the present embodiment will now be described.

Figure 16A:
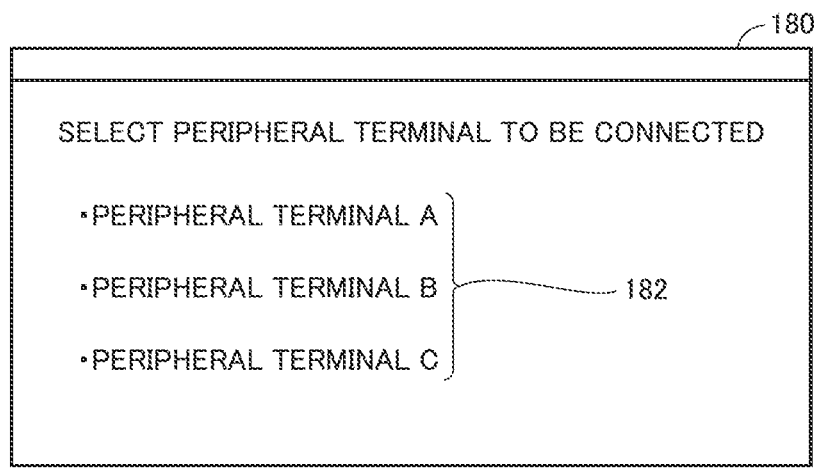
FIGS. 16A and 16B each show an exemplary illustrative non-limiting drawing illustrating an exemplary user interface screen provided by the central terminal in the communication system according to the present embodiment.

A user interface screen 180 shown in FIG. 16A is provided in accordance with a result of search for connectable peripheral terminal 200 by central terminal 100 at the time of connection for the first time between central terminal 100 and peripheral terminal 200 (see sequence SQ10 or the like in FIGS. 6 and 9). More specifically, user interface screen 180 includes a candidate list 182 of found peripheral terminals 200. The user selects peripheral terminal 200 connection to which is desired, from among peripheral terminals 200 shown in candidate list 182. Then, processing for connection between central terminal 100 and selected peripheral terminal 200 is started (see sequence SQ12 or the like in FIGS. 6 and 9).

Figure 16B:
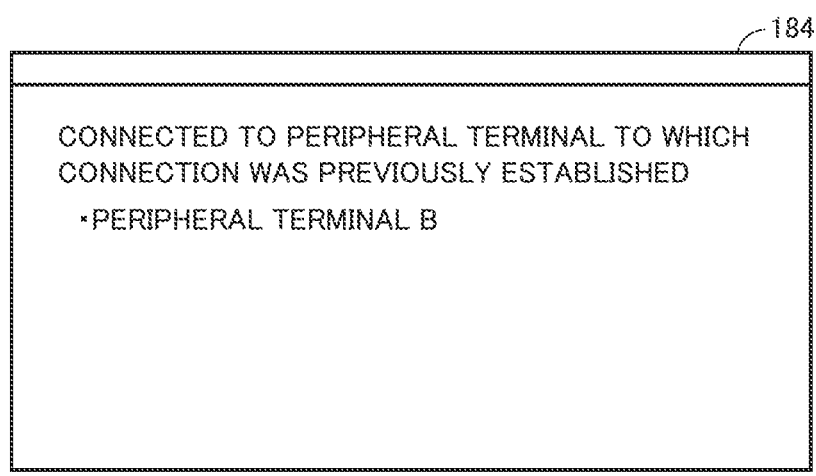

A user interface screen 184 shown in FIG. 16B is provided in re-connection between central terminal 100 and peripheral terminal 200. More specifically, when central terminal 100 is connected to peripheral terminal 200 that satisfies the condition for re-connection (see sequence SQ52 in FIG. 7 and sequence SQ60 in FIG. 10), user interface screen 184 presents connected peripheral terminal 200 to the user.

[I. Search for Peripheral Terminal and Advertisement]

An advertisement used for search for peripheral terminal 200 will now be described.

In some peripheral terminal 200, transmission of an advertisement is started by pressing of a button provided in peripheral terminal 200. Therefore, in connection between central terminal 100 and peripheral terminal 200, a user has to perform such an operation as pressing a button in peripheral terminal 200. The user may be supported for such an operation to press the button in peripheral terminal 200 by central terminal 100.

Figure 17A:
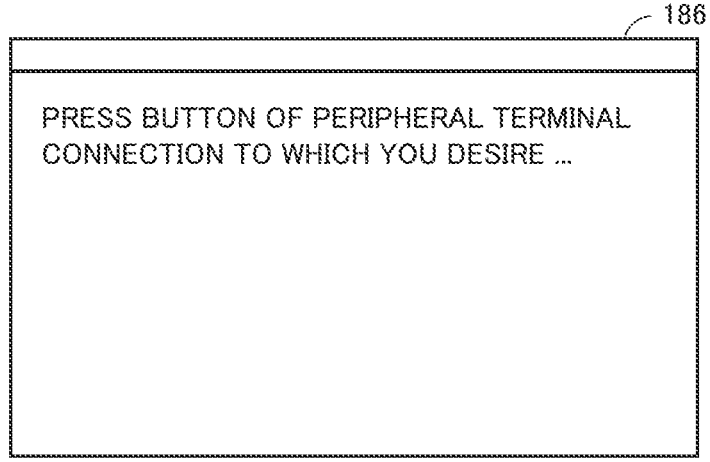
FIGS. 17A and 17B each show an exemplary illustrative non-limiting drawing illustrating another exemplary user interface screen provided by the central terminal in the communication system according to the present embodiment.

When connection to peripheral terminal 200 is required while central terminal 100 is executing any application, central terminal 100 provides a user interface screen 186 as shown in FIG. 17A. User interface screen 186 includes a message that invites a user to press the button in peripheral terminal 200 connection to which is desired.

Figure 17B:
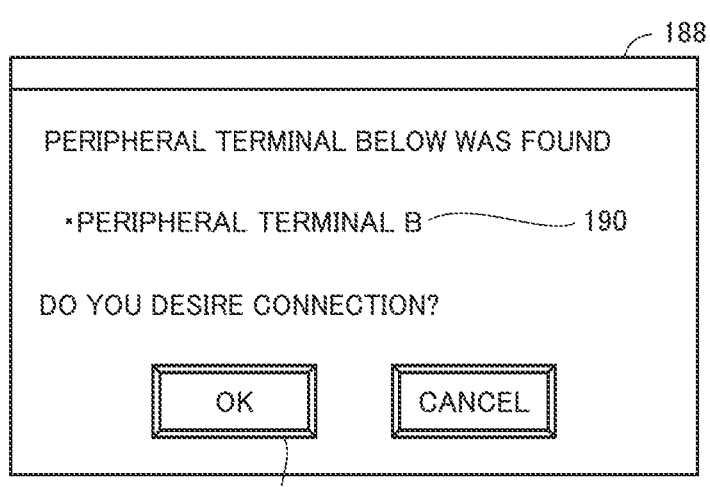

When the user presses the button in peripheral terminal 200 and central terminal 100 finds peripheral terminal 200 as connectable peripheral terminal 200, a user interface screen 188 as shown in FIG. 17B is provided.

User interface screen 188 includes an OK button 192 that accepts an instruction for connection, in addition to specifying information 190 indicating connectable peripheral terminal 200. The user checks specifying information 190 shown on user interface screen 188 and then presses OK button 192. Then, processing for connection between central terminal 100 and peripheral terminal 200 is started.

Alternatively, processing for connection between central terminal 100 and peripheral terminal 200 may be started in response to an operation by the user onto input unit 202 of peripheral terminal 200.

An application executed in central terminal 100 may automatically be connected to peripheral terminal 200 nearby without showing the user interface screen as shown in FIGS. 16A, 16B, 17A, and 17B and start data communication.

A method of searching for or determining peripheral terminal 200 to be connected is various depending on an application executed in central terminal 100. A plurality of types of advertisements transmitted from peripheral terminal 200 may be prepared. In other words, peripheral terminal 200 may be configured to transmit a plurality of types of advertisements.

Figure 18:
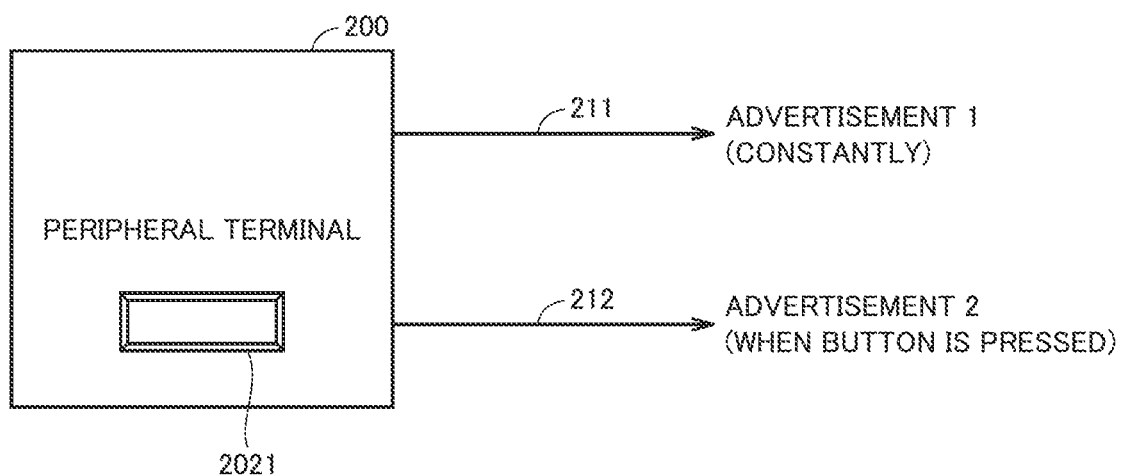
FIG. 18 shows an exemplary illustrative non-limiting drawing illustrating an exemplary advertisement transmitted from the peripheral terminal in the communication system according to the present embodiment.

Referring to FIG. 18, peripheral terminal 200 may transmit two types of advertisements.

In an exemplary configuration shown in FIG. 18, peripheral terminal 200 implements a constantly transmitted advertisement 211 and an advertisement 212 transmitted at the time when a button 2021 in peripheral terminal 200 is pressed. The advertisement is periodically transmitted in broadcast communication. Therefore, "constant transmission" means continued periodic transmission.

By thus preparing a plurality of advertisements different in transmission condition for peripheral terminal 200, processing for connection to peripheral terminal 200 by an application executed in central terminal 100 can be various. Specifically, an advertisement to be used in processing for searching for peripheral terminal 200 to be connected may be selected as appropriate depending on a type of the application or a scene.

For example, at the time of connection for the first time, in order to simplify or facilitate selection of peripheral terminal 200 to be connected, connectable peripheral terminal 200 may be searched for with the use of advertisement 212 transmitted at the time when button 2021 is pressed (see sequence SQ10 or the like in FIGS. 6 and 9). In other words, only peripheral terminal 200 for which the user has explicitly pressed button 2021 is searched for as a connection target.

In re-connection, all peripheral terminals 200 present around central terminal 100 may be searched for by using constantly transmitted advertisement 211 (see sequence SQ40 or the like in FIGS. 7 and 10), because pair information 160 and pair information 260 have been prepared.

Alternatively, in some application, also in re-connection, connectable peripheral terminal 200 may be searched for with the use of advertisement 212 transmitted at the time when button 2021 is pressed. In other words, also in re-connection, only peripheral terminal 200 for which the user has explicitly pressed button 2021 may be searched for as a connection target.

Each of applications 150 executed in central terminal 100 may thus be configured to refer to one or more advertisements 211 and 212 specific to application 150 among a plurality of types of advertisements 211 and 212. The type of advertisement transmitted from central terminal 100 is not limited to two types, and more types of advertisements may be transmitted.

Though central terminal 100 can more easily find peripheral terminal 200 by constantly transmitting advertisement 211, battery consumption in peripheral terminal 200 may increase.

Then, central terminal 100 may instruct peripheral terminal 200 to stop constant transmission of advertisement 211.

Figure 19:
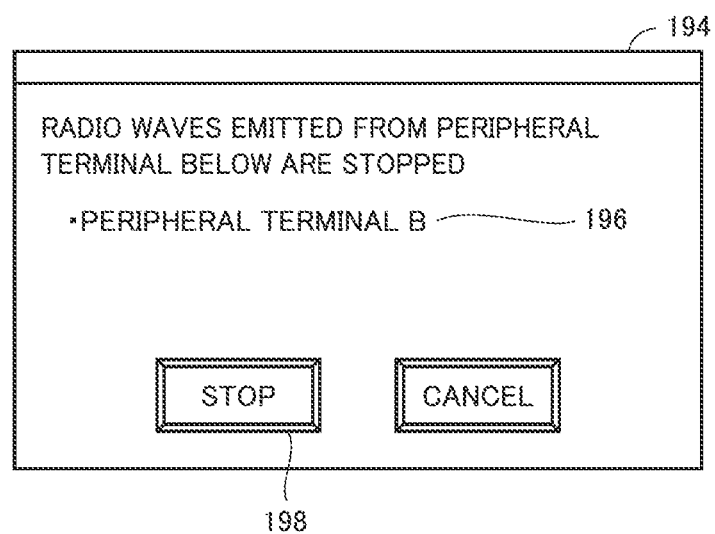
FIG. 19 shows an exemplary illustrative non-limiting drawing illustrating yet another exemplary user interface screen provided by the central terminal in the communication system according to the present embodiment.

Referring to FIG. 19, a user interface screen 194 includes an OK button 198 that accepts an instruction to stop advertisement 211 in addition to specifying information 196 indicating peripheral terminal 200 of interest. The user checks specifying information 196 shown on user interface screen 194 and then presses OK button 198. Then, an instruction is issued from central terminal 100 to peripheral terminal 200 of interest, and peripheral terminal 200 stops transmission of advertisement 211.

Central terminal 100 may thus instruct peripheral terminal 200 to stop transmission of advertisement 211. At this time, any application executed in central terminal 100 may issue an instruction to stop transmission of advertisement 211 to peripheral terminal 200. In other words, any application 150 configured to refer to constantly transmitted advertisement 211 among applications 150 executed in central terminal 100 may be able to stop transmission of advertisement 211.

In other words, processing for indicating stop of transmission of advertisement 211 may be performed in central terminal 100 and may be implemented by any application that can use peripheral terminal 200. The processing for indicating stop of transmission may be implemented only by an application that uses constantly transmitted advertisement 211 among the applications.

FIG. 19 shows an example in which a notification to stop transmission of advertisement 211 is given by explicit pressing of OK button 198 by the user. Without being limited to such an operation by the user, notification to stop transmission of advertisement 211 may automatically be given when a predetermined condition is satisfied.

For example, when central terminal 100 is set to an airplane mode, in step with the setting, the application may automatically indicate stop of transmission of advertisement 211.

Constantly transmitted advertisement 211 may also be set to an inactive state in initial setting. In this case, when connection to central terminal 100 that executes any application is established, constant transmission of advertisement 211 may automatically be activated without an operation by the user.

By providing a user interface screen similar to that in FIG. 19, transmission of advertisement 211 may be resumed at any timing in accordance with an operation by the user.

By thus allowing advertisement 211 constantly transmitted from central terminal 100 to freely be stopped, battery consumption in peripheral terminal 200 can be suppressed.

[J. Other Forms]

(j1: Combination of Processing Forms)

FIGS. 6 and 7 described above show a form in which central terminal 100 manages pair information, and FIGS. 9 and 10 show a form in which management server 300 manages pair information. Such forms of processing may be combined as appropriate without being fixed to one of such processing forms.

For example, once management server 300 determines that pair information 260 of peripheral terminal 200 satisfies the condition for re-connection and when central terminal 100 thereafter obtains identical pair information 260 from identical peripheral terminal 200, central terminal 100 may determine that the condition for re-connection is satisfied without making an inquiry to management server 300.

In other words, though management server 300 subjectively determines whether or not pair information 260 of peripheral terminal 200 satisfies the condition for re-connection, management server 300 does not always have to do so. Management server 300 may determine whether or not the condition for re-connection is satisfied only when central terminal 100 determines that it has to issue an inquiry to management server 300.

When processing as described above is adopted, a result of comparison from management server 300 and pair information 260 from which the result of comparison originates are preferably cached in central terminal 100 for a predetermined period. A period of cache of the result of comparison and pair information 260 can also be determined as appropriate in consideration of usability and security.

(j2: Update of Pair Information)

The pair information held in central terminal 100 and peripheral terminal 200 may be updated under any condition or at any timing. For example, information on which definition of an expiration date can be based may be added to the pair information, and central terminal 100 may determine as appropriate whether or not the pair information has expired. The expiration date may be stored in at least one of central terminal 100, peripheral terminal 200, and management server 300.

When the pair information has expired, central terminal 100 may generate new identification information and update the pair information.

Furthermore, the pair information in peripheral terminal 200 may be deleted or erased in accordance with an instruction from central terminal 100. For example, when an application that has been executed in central terminal 100 is updated or uninstalled, peripheral terminal 200 may be instructed to delete the pair information. Deletion of the pair information can deactivate previously used pair information and prevent unnecessary re-connection.

(j3: Entity that Executes Application)

Though an example in which central terminal 100 executes application 150 is described in the description above, a computing resource on the network (what is called a cloud) may be responsible for execution per se of application 150. In this case, central terminal 100 shows a result of execution of application 150 executed in the computing resource, which, however, is equivalent to execution of application 150 in central terminal 100 from a point of the user.

Therefore, execution of application 150 by central terminal 100 herein may encompass, in addition to execution of application 150 by central terminal 100 itself, all of execution of application 150 in cooperation by central terminal 100 and any computing resource, and execution of application 150 by any computing resource and representation of a result thereof on central terminal 100.

Execution of application 150 by central terminal 100 includes also execution in the background in addition to execution in the foreground. In other words, any form of execution of application 150 may be applicable.

(j4: Management Server 300)

Though an exemplary configuration in which management server 300 is arranged for each application is shown in the description above, management server 300 in common to a plurality of applications may be arranged. In this case, application type information may be brought in correspondence with pair information 160 managed by management server 300.

[K. Advantages]

According to the communication system according to the present embodiment, in an environment in which certain peripheral terminal 200 is used by a plurality of applications 150 whereas the plurality of applications 150 that use peripheral terminal 200 are not necessarily executed in the same central terminal 100, peripheral terminal 200 can suitably be used by each of applications 150 executed in at least one central terminal 100.

According to the communication system according to the present embodiment, even though there are a plurality of central terminals 100 and each of central terminals 100 executes various applications, establishment of connection to and data communication with peripheral terminal 200 suitable for each application 150 can be achieved.

According to the communication system according to the present embodiment, in a set of application 150 and peripheral terminal 200 that communicated data with each other in the past, data communication next time or later can smoothly be resumed and started.

According to the communication system according to the present embodiment, connection between central terminal 100 and peripheral terminal 200 is established, and then pair information is transmitted from peripheral terminal 200 to central terminal 100 to determine whether or not data is to be communicated based on the transmitted pair information. By adopting such a two-step configuration, an amount of communication can be smaller than in an example in which pair information is included in an advertisement.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A communication system comprising:
    a first terminal configured to execute one or more applications; and
    a second terminal configured to communicate data with the first terminal through wireless communication, wherein
    the second terminal comprising:
        a storage configured to store one or more pair information entries, wherein each pair information entry includes application data for any of a plurality of different applications and associated connection data, and
        a transmitter configured to transmit, in response to a request that includes an identified application for an application executed in the first terminal, second information that is based on the pair information entry that includes the application data which corresponds to the identified application included in the request, and
    the first terminal configured to determine processing involved with data communication with the second terminal based on a result of comparison between third information that is associated with an application that is being executed on the first terminal and the second information received from the second terminal.

2. The communication system according to claim 1, wherein
    the first terminal comprises an apparatus that accepts an operation by a user and a management server.

3. The communication system according to claim 2, wherein
    the first terminal is further configured to generate pair information.

4. The communication system according to claim 3, wherein
    the management server is further configured to generate the pair information.

5. The communication system according to claim 3, wherein
the management server is further configured to compare the third information and the second information with each other.

6. The communication system according to claim 1, wherein
the first terminal further comprises a second storage in which, when the first terminal is connected to the second terminal, an address of the connected second terminal is stored.

7. The communication system according to claim 1, wherein
the first terminal is further configured to:
receive an advertisement transmitted from the second terminal; and
search for the second terminal to be connected.

8. The communication system according to claim 7, wherein
when an address of the second terminal which is a sender of the received advertisement is included in addresses stored in a second storage, the first terminal being further configured to:
start processing for connection to the second terminal which is the sender, and
after connection is established, transmit the request to the second terminal.

9. The communication system according to claim 1, wherein
the second terminal is configured to transmit a plurality of types of advertisements, and
each of the applications executed in the first terminal is configured to refer to one or more advertisements specific to the application among the plurality of types of advertisements.

10. The communication system according to claim 9, wherein
the plurality of types of advertisements include a constantly transmitted advertisement, and
any application configured to refer to the constantly transmitted advertisement among the applications executed in the first terminal is configured to stop transmission of the constantly transmitted advertisement.

11. The communication system according to claim 1, wherein application data includes an application type.

12. The communication system according to claim 1, wherein the second information includes associated connection data that corresponds to the identified application included in the request.

13. A communication method performed by a first terminal and a second terminal that communicate data with each other through wireless communication, the communication method comprising:
executing, by the first terminal, one or more applications;
storing, in the second terminal, one or more pair information entries, wherein each pair information entry includes application data for any of a plurality of different applications and associated connection data;
in response to a request that includes an identified application for an application executed in the first terminal, transmitting, by the second terminal, second pair information that is based on the pair information entry that includes the application data which corresponds to the identified application included in the request; and
determining, by the first terminal, processing involved with data communication with the second terminal based on a result of comparison between third information that is associated with an application that is being executed on the first terminal and second information received from the second terminal.

14. A non-transitory computer-readable storage medium with an executable communication program stored thereon, the communication program, when executed by one or more processors of a communication apparatus that executes one or more applications, causing the one or more processors to perform operations comprising:
communicating data with a peripheral terminal through wireless communication, the peripheral terminal configured to store one or more pair information entries, wherein each pair information entry includes application data for any of a plurality of d ent applications and associated connection data;
communicating, to the peripheral terminal, a request that includes an identified application for a running application;
receiving, in response to the request, second information that is based on the pair information entry that includes the application data which corresponds to the identified application included in the request; and
determining processing involved with data communication with the peripheral terminal based on a result of comparison between the second information obtained from the peripheral terminal and third information that is associated with the running application.

15. A communication apparatus comprising:
a memory storing a computer-readable program; and
one or more processors, when executing the computer-readable program, that are configured to perform operations comprising:
executing one or more applications,
communicating data with a peripheral terminal through wireless communication, the peripheral terminal configured to store one or more pair information entries, wherein each pair information entry includes application data for any of a plurality of different applications and associated connection data, and
communicating, to the peripheral terminal, a request that includes an identified application for a running application,
receiving, in response to the request, second information that is based on the pair information entry that includes the application data which corresponds to the identified application included in the request,
determining processing involved with data communication with the peripheral terminal based on a result of comparison between the second information obtained from the peripheral terminal and third information that is associated with the running application.

16. A communication apparatus comprising:
a memory storing a computer-readable program; and
one or more processors, when executing the computer-readable program, that are configured to perform operations comprising:
communicating data through wireless communication with a central terminal that executes one or more applications,
storing in a storage one or more pair information entries, wherein each pair information entry includes application data for any of a plurality of different applications and associated connection data, and
transmitting, in response to a request that includes an identified application for an application executed in the central terminal, second information that is based on the pair information entry that includes the application data which corresponds to the identified application included in the request.

* * * * *